(12) United States Patent
Holt et al.

(10) Patent No.: US 6,871,064 B1
(45) Date of Patent: Mar. 22, 2005

(54) OUTGOING CALL HANDLING SYSTEM AND METHOD

(75) Inventors: Scott C. Holt, Smyrna, GA (US); M. Scott Laster, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/530,119

(22) PCT Filed: Oct. 27, 1998

(86) PCT No.: PCT/US98/22714

§ 371 (c)(1),
(2), (4) Date: Apr. 24, 2000

(87) PCT Pub. No.: WO99/23802

PCT Pub. Date: May 14, 1999

Related U.S. Application Data

(60) Provisional application No. 60/065,958, filed on Nov. 4, 1997.

(51) Int. Cl.[7] .............................. H04B 1/00; H04M 3/42; H04M 11/00
(52) U.S. Cl. ................................ 455/414.1; 455/414.2; 455/416; 455/563; 455/70; 379/88.01; 379/88.03; 379/218.01
(58) Field of Search ................................ 455/563, 564, 455/569, 68, 70, 414.1, 414.2, 422.1; 379/88.01, 88.03, 88.04, 88.18, 218.01, 205.01, 907, 211.02

(56) References Cited

U.S. PATENT DOCUMENTS

| | | |
|---|---|---|
| 4,644,107 A | 2/1987 | Clowes et al. |
| 4,893,335 A | 1/1990 | Fuller et al. |
| 4,942,598 A | 7/1990 | Davis |
| 5,063,588 A | 11/1991 | Patsiokas et al. |
| 5,204,894 A | 4/1993 | Darden |
| 5,274,699 A | 12/1993 | Ranz |
| 5,339,352 A | * 8/1994 | Armstrong et al. ......... 455/417 |
| 5,349,636 A | 9/1994 | Irribarren |
| 5,353,328 A | 10/1994 | Jokimies |

(List continued on next page.)

OTHER PUBLICATIONS

Digital Cellular Telecommunications System; Unstructured Supplementary Service Data (USSD)—Stage 2 (Global System for Mobile Communications 03.90) Version 5.0.0; European Telecommunications Standards Institute (ETSI), Dec. 1996, Sophia Antipolis, France.

Accessline's Dumb Subscriber Service, Computer Telephony, Jul. 1, 1995, United States.

AIN—It Lets You Get Inside The Phone Network, Computer Telephony, Apr. 1, 1996, United States.

(List continued on next page.)

*Primary Examiner*—Duc M. Nguyen
(74) *Attorney, Agent, or Firm*—Thomas, Kayden, Horstemeyer & Risley, LLP

(57) ABSTRACT

A cellular system for handling outgoing calls from a mobile station (1) including, a network element (8) being capable of recognizing voiced commands and names, and has in memory a database of telephone numbers corresponding to an array of names. The mobile station (1) connects to the network element (8) and the mobile station user communicates the desired outgoing call function to the network element (8) by voice. This desired outgoing call function may be communicated while the mobile station (1) is engaged in using supplementary services provided by the network element (8), at any operation point in those services. The network element (8) evaluate the voice communication, retrieves any corresponding information, including telephone numbers, and communicates the necessary information need by the mobile station (1) to carry out the desired function to the mobile station (1).

38 Claims, 13 Drawing Sheets

U.S. PATENT DOCUMENTS

| | | | |
|---|---|---|---|
| 5,369,685 A | 11/1994 | Kero | 379/67 |
| 5,371,901 A | 12/1994 | Reed et al. | |
| 5,375,161 A | 12/1994 | Fuller et al. | |
| 5,452,340 A | 9/1995 | Engelbeck et al. | |
| 5,473,671 A | 12/1995 | Partridge, III | |
| 5,483,579 A | 1/1996 | Stogel | |
| 5,504,805 A | 4/1996 | Lee | |
| 5,509,049 A | 4/1996 | Peterson | |
| 5,559,860 A | 9/1996 | Mizikovsky | |
| 5,572,576 A | 11/1996 | Klausner et al. | |
| 5,583,925 A | 12/1996 | Bernstein | |
| 5,588,037 A | 12/1996 | Fuller et al. | |
| 5,610,970 A | 3/1997 | Fuller et al. | |
| 5,652,789 A | 7/1997 | Miner et al. | |
| 5,659,597 A | 8/1997 | Bareis et al. | |
| 5,673,299 A | 9/1997 | Fuller et al. | |
| 5,717,740 A | 2/1998 | Penning et al. | |
| 5,758,279 A | 5/1998 | Foti | |
| 5,764,731 A | 6/1998 | Yablon | |
| 5,835,570 A | 11/1998 | Wattenbarger | |
| 5,905,774 A | 5/1999 | Tatchell et al. | |
| 5,953,393 A | 9/1999 | Culbreth et al. | |
| 5,960,395 A | 9/1999 | Tzirkel-Hancock | |
| 5,999,611 A | 12/1999 | Tatchell et al. | |
| 6,021,181 A | 2/2000 | Miner et al. | |
| 6,047,053 A | 4/2000 | Miner et al. | |
| 6,144,723 A * | 11/2000 | Truchon et al. | 379/88.01 |
| 6,160,877 A | 12/2000 | Tatchell et al. | |

OTHER PUBLICATIONS

Churn Spurners and Money Earners, Accessline Technologies, Computer Telephony, Nov. 1997, United States.

Ellen Muraskin, Speech Rec Ready, Computer Telephony, vol. 6, Issue 6, Jun. 1, 1998, United States.

Thomas K. Crowe, Esq., Payphone Payback, Computer Telephony, Aug. 1, 1998, United States.

Dan O'Shea, Programmable Switching: The Flexible Foundation, TELEPHONY, vol. 230, Issue 26, Mar. 4, 1996, p. 22, Chicago, Illinois.

Jason Meyers, Wireless Eyes Are On Differentiation, TELEPHONY, vol. 230, Issue 26, Jun. 24, 1996, p. 30, Chicago, Illinois.

Jason Meyers, Giving Wireless An Edge, TELEPHONY, vol. 231, Issue 4, Jul. 22, 1996, p. 64, Chicago, Illinois.

Jason Meyers, Personal Numbers Get A Plug, TELEPHONY, vol. 232, Issue 9, Mar. 3, 1997, p. 8, Chicago, Illinois.

Dan O'Shea, The Talk Of The Industry . . . Again, TELEPHONY, vol. 232, Issue 11, Mar. 17, 1997, p. 99, Chicago, Illinois.

PCT/US98/22736 International Search Report, Mar. 12, 1999.

PCT/US98/22714 International Search Report, Apr. 14, 1999.

\* cited by examiner

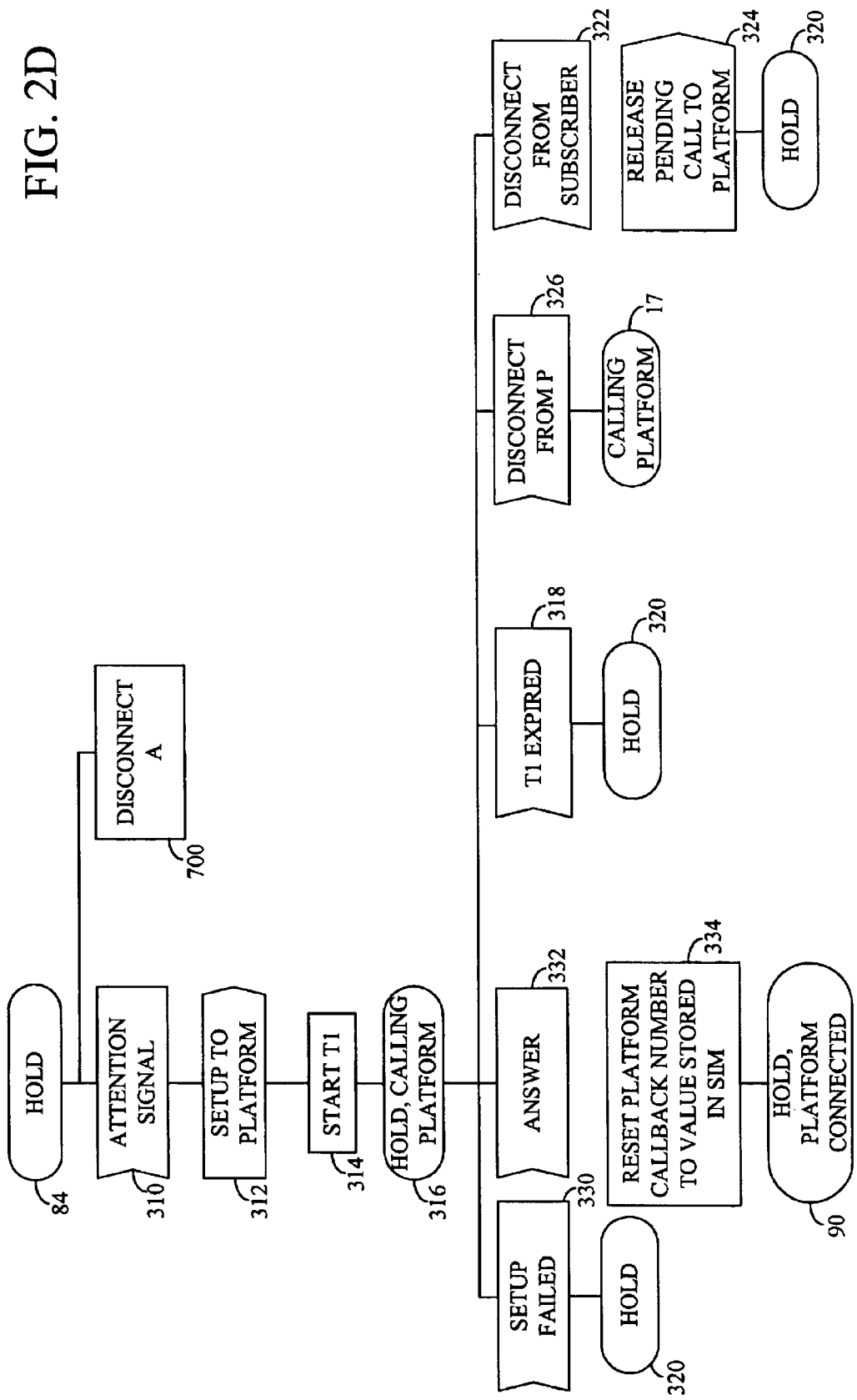

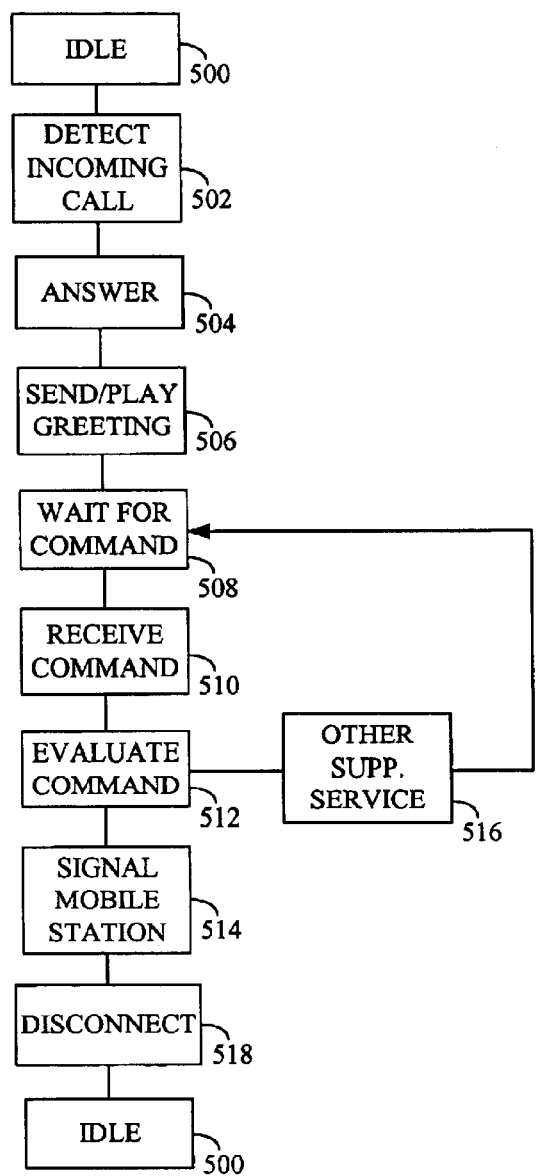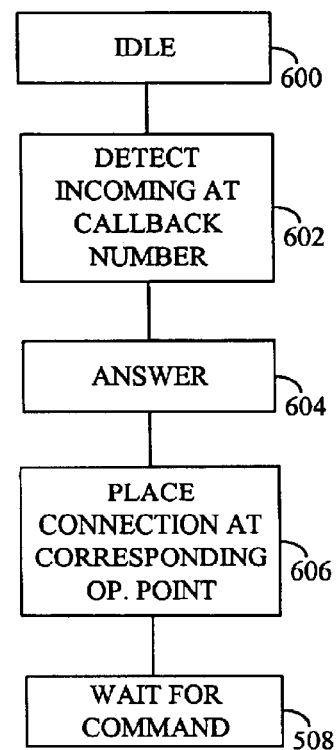
FIG. 3A
FIG. 3B

OUTGOING CALL HANDLING SYSTEM AND METHOD

This application claims the benefit of Provisional application Ser. No. 60/065,958 filed Nov. 4, 1997.

FIELD OF THE INVENTION

This invention relates to systems and method for handling outgoing calls from a mobile station, or handset, in a cellular telephone system. Particularly, this invention relates to systems and methods for handling outgoing calls from a mobile station in which the mobile station and a network element cooperate in handling such calls.

INCORPORATION BY REFERENCE

The subject matter disclosed and claimed in the copending Ser. No. 09/530,124 application, entitled "Call Screening Method and Apparatus," invented by the same inventors, filed on the same day as the instant application, and to be assigned to the same assignee, is hereby incorporated by reference.

BACKGROUND OF THE INVENTION

The use of cellular telephones or mobile stations has proliferated throughout the world. One of the primary reasons for this proliferation is the convenience associated with cellular-telephone use.

Mobile stations are often used in constrained conditions, such as an automobile or in a crowd of people, by persons who are traveling and in a rush. In such places, it is often difficult to focus on manipulating the dial pad of the telephone. Moreover, if the user of the telephone does not remember the telephone number of the person the user wishes to dial, it is often difficult in such conditions to look up the telephone number in the user's telephone book. These are some of the disadvantages of the cellular telephones and cellular-telephone systems commonly in use today.

U.S. Pat. No. 4,644,107 to Clowes et al. discloses a telephone which stores names and corresponding telephone numbers. The telephone recognizes voice, and when a name which is stored by the telephone is spoken, the telephone dials the telephone number corresponding to that spoken name. Other, similar inventions are disclosed in U.S. Pat. No. 5,483,579 to Stogelx and U.S. Pat. No. 5,452,340 to Engelbeck et al.

The products disclosed in the above-cited references offer the advantage of storing telephone numbers such that the user of the telephone does not have to pause to look up the number of the party the user wishes to dial. Also, the products disclosed in the above-cited references offer the advantage of allowing the user to dial the desired party by speaking the party's name.

One of the disadvantages of the conventional products disclosed in the above-cited references is that the names and numbers are stored in the telephone. Storage of names and numbers in a cellular telephone does not easily allow users of other mobile stations to access the stored data. Moreover, such storage requires memory circuitry within the cellular telephone. Although developments in circuit integration have reduced the size of such circuitry considerably, such circuitry nonetheless requires some space within the cellular telephone and increases the weight of the telephone. It is desirable to manufacture cellular telephones with dimensions and weight as small as possible.

Another disadvantage of conventional products results from the volatility of memory. The mobility of cellular phones expose such phones to physical forces that can cause a loss of power or damage to the telephone's memory. When such products store names and numbers within the mobile station, such volatility risks loss or damage to that data.

Another disadvantage of conventional products is that such products do not perform network functions, such as setting up a conference call and interacting with network resources to find a desired telephone number.

Another disadvantage of conventional products that store names and numbers within a mobile station is that mobile stations do not have access to the data stored within other mobile stations. A person that has multiple conventional phones must program each phone individually.

Another disadvantage of conventional products is that mobile stations must allow the network platform to perform call control.

Another disadvantage of conventional products is that trombone trunking, generally requiring all calls to route into and out from the network platform, is relied upon.

SUMMARY OF THE INVENTION

The present invention features processes and apparatus for handling outgoing calls from a mobile station in a cellular telecommunication system. The processes are carried out by, and the apparatus comprises, a mobile station, a base station subsystem, network switching subsystem, and a network element, e.g., an intelligent-network (IN) platform, Service Control Point (SCP), Service Node (SN), Advanced Intelligent Network (AIN), Intelligent Peripherals (IPs) or other network element. Preferably this network element is an IN platform. Such apparatus have functionality that can associate those numbers with the corresponding names.

The present invention allows call control to alternate between the mobile station and the IN platform. The mobile station detects an attention signal from the user and calls a platform at a platform callback number. The platform detects the incoming call and answers the call, thereby connecting the mobile station with the platform. The platform sends a greeting to the mobile station and waits for a command from the mobile station. The mobile station receives a user command from the user and communicates this command to the platform, which the platform receives and evaluates. After evaluating the command, the platform sends a corresponding command signal to the mobile station and the mobile station receives the command signal. The mobile station then carries out an outgoing call function corresponding to the command signal, such as calling a particular number, conferencing with a particular number, or carrying out such functions and then calling the platform back to resume communication with the platform at the operation point at which the command was given by the mobile station.

The present invention offers the advantages of the products disclosed in the above-cited references. That is, one advantage of the present invention is that it includes storage of telephone numbers such that the user of the telephone does not have to pause to look up the number of the party the user wishes to dial. Another advantage of the present invention is the user may dial the desired party by speaking the party's name.

Another important advantage of the present invention is that utilization of platform capabilities and network resources are greatly reduced. Conventional outgoing call handling methods and devices place considerable emphasis on utilizing platform capabilities and network resources. The present invention emphasizes utilization of the mobile station in carrying out and controlling outgoing calls and associated functions. The present invention contemplates connecting to and using the capabilities of platforms only when necessary. The present invention allows up to eighty to ninety percent less utilization of Intelligent Network ("IN") platforms and trunks with port connections than conventional systems. Thus, the platform's resources are freed up to provide services to a great number of subscribers and to provide services which require greater platform resources than are normally available with conventional systems.

Another advantage of the present invention is that it enables network costs to be reduced and can make speech-recognition and control in communications networks more affordable.

Another advantage of the present invention is that billing for enhanced services is simpler than conventional systems. The present invention contemplates that all enhanced service calls either originate or terminate at the mobile station. Thus, the platform or adjunct systems would not be required to gather billing information. Consequently, all billing could be switch-based.

Another advantage of the present invention is that it is not necessary to modify structure in conventional switches in order to implement the present invention. Thus, only minimal modifications to conventional cellular-telephone networks are necessary to implement the present invention.

Another advantage of the present invention is that the present invention performs network activity, such as setting up a conference call, and interacts with network resources to find a desired telephone number.

Another advantage of the present invention is that multiple mobile stations may access a database. Thus, the owner of multiple mobile stations need only input names and telephone numbers a single time.

Another advantage of the present invention is that it contemplates the storage of data at one or more platforms, e.g., a fault-tolerant network platform. Thus, the loss of power or receipt of a physical impact of a mobile station contemplated by the present invention does not risk the loss of data as with conventional mobile stations. Moreover, the purchase of a new mobile station does not require the user to reprogram data as with conventional mobile stations.

Another advantage of the present invention is that it provides the process of passing call control back-and-forth between the network platform and the mobile station.

Another advantage of the present invention is that the mobile station can interactively control a call in conjunction with a network platform, thus interaction with a PSTN switch (or other public network switch) or an SCP is not necessary.

Another advantage of the present invention is that the user of a mobile station may initiate a communication session with the network platform rather than waiting for a message from the network platform.

Another advantage of the present invention is that call-control commands, such as a command to conference, may be initiated while the mobile station is carrying out a call session.

Another advantage of the present invention is that it allows alternating call control between a mobile station and a network platform.

The present invention offers other advantages, including: multiple users may easily access a database of stored names and corresponding telephone numbers, and the dimensions and weight of mobile stations may be reduced.

BRIEF DESCRIPTION OF THE DRAWINGS

FIG. 2D is a flow chart illustrating a fourth portion of an embodiment of processes according to the present invention.

FIG. 3A is a flow chart illustrating a process according to the present invention, showing particularly action of the intelligent network platform.

FIG. 3B is a flow chart illustrating a process according to the present invention, showing particularly action of the intelligent network platform.

DETAILED DESCRIPTION OF THE PREFERRED EMBODIMENT

Figure 1A:
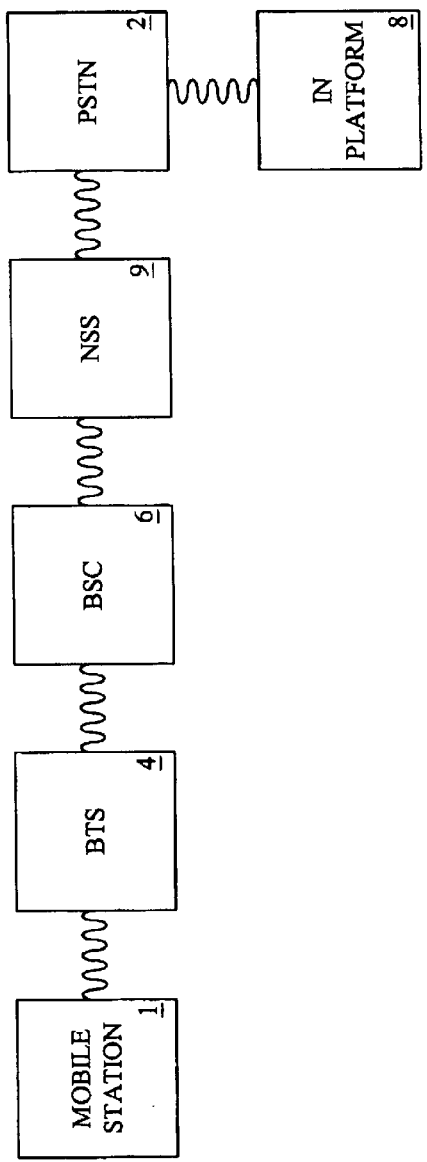
FIG. 1A is a block diagram of a system according to the present invention.

In a first embodiment of the present invention provides an outgoing-call handling method, said method carried out by an apparatus comprising a mobile station and an intelligent telecommunications network element, said method comprising the following steps: a) detecting an attention signal; b) calling the network element at a network element callback number; c) connecting with the network element; d) communicating a user command to the network element; e) receiving a command signal from the network element corresponding to said user command; f) disconnecting from the network element; and g) in a mobile station, carrying out a function corresponding to said command signal. A second embodiment includes the steps described in the first embodiment, and step b is carried out in the mobile station. A third embodiment includes the steps described in the second embodiment, and said command signal comprises at least one of: first data corresponding to a telephone number, a control signal, and second data corresponding to a network element callback telephone number. A fourth embodiment includes the steps described in the third embodiment, and said function comprises connecting with the telephone number corresponding to said first data. A fifth embodiment includes the steps described in the fourth embodiment, and said function comprises setting the network element callback number to the number corresponding to said second data in the event that said command signal comprises said second data. A sixth embodiment includes the steps described in the fifth embodiment, and said function comprises setting the network element callback number to the number corresponding to said second data and connecting with the network element callback number upon disconnection with the telephone number corresponding to the first data in the event said control signal comprises a with-callback signal and said second data. A seventh embodiment includes the steps described in the sixth embodiment, and said function comprises being placed at a operation point corresponding to the network element callback number called.

An eighth embodiment includes the steps described in the third embodiment, and the function comprises calling the number corresponding to said first data in the event that said control signal signifies calling the number corresponding to said first data. A ninth embodiment includes the steps described in the third embodiment, and the function comprises calling the number corresponding to said first data and placing said call in a multi-party connection with any other connected party in the event that said control signal signifies conferencing with the number corresponding to said first data. A tenth embodiment includes the steps described in the third embodiment, and the function comprises connecting with the number corresponding to said first data and then calling the number corresponding to said second data upon disconnection from said connection in the event that said control signal signifies calling the number corresponding to said first data and then returning to the present operation point. An eleventh embodiment includes the steps described in the third embodiment, and the function comprises connecting with the number corresponding to said first data and including said connection in a conference call with all other connected calls in the event that said control signal signifies conferencing with the number corresponding to said first data. A twelfth embodiment includes the steps described in the seventh embodiment, and said step of communicating a user command to the network element is carried out using a radio frequency signal. A thirteenth embodiment includes the steps described in the first embodiment, and said network element is a platform. A fourteenth embodiment includes the steps described in the first embodiment, and said network element is an intelligent network platform. A fifteenth embodiment includes the steps described in the first embodiment, and said network element comprises hardware that is capable of sensing a current status of a call to the network element and of assigning a platform-callback number that will return the mobile station to that status when called.

A sixteenth embodiment includes the steps described in the fourteenth embodiment, and said command signal comprises at least one of: first data corresponding to a telephone number, a control signal, and second data corresponding to a network element callback telephone number. A seventeenth embodiment includes the steps described in the sixteenth embodiment, and said function comprises connecting with the telephone number corresponding to said first data. An eighteenth embodiment includes the steps described in the fifteenth embodiment, and said command signal comprises at least one of: first data corresponding to a telephone number, a control signal, and second data corresponding to a network element callback telephone number. A nineteenth embodiment includes the steps described in the eighteenth embodiment, and said function comprises connecting with the telephone number corresponding to said first data.

A twentieth embodiment includes an outgoing-call handling method, said method carried out by an apparatus comprising an intelligent telecommunications network element, said method comprising the following steps: a) detecting an incoming call; b) answering said call; c) establishing connection with said call; d) if said call is to one of a first set of preselected network element callback numbers, sending greeting to caller; if said call is to one of a second set of preselected network element callback numbers, placing said connection at operation point within the network element operation corresponding to the called callback number; e) waiting for command; f) receiving command; g) evaluating command; and h) if said command corresponds to a command to enter a selected platform-based service, entering the selected platform-based service and returning to step e); and if said command corresponds to a command to signal a command signal, sending a command signal corresponding to said command to the mobile station and disconnecting call.

A twenty-first embodiment includes the steps described in the twentieth embodiment, and step b is carried out in said network element. A twenty-second embodiment includes the steps described in the twenty-first embodiment, and said command signal comprises at least one of: first data corresponding to a telephone number, a control signal, and a second data corresponding to a network element callback number. A twenty-third embodiment includes the steps described in the twenty-second embodiment, and said selected platform-based service is a voice-mail messaging service. A twenty-fourth embodiment includes the steps described in the twenty-third embodiment, and said one of a second set of preselected network element callback numbers corresponds to an operation point within said voice-mail messaging service. A twenty-fifth embodiment includes the steps described in the twenty-fourth embodiment, and said step of sending a command signal is carried out with a radio frequency signal. A twenty-sixth embodiment includes the steps described in the twentieth embodiment, and said network element is a platform. A twenty-seventh embodiment includes the steps described in the twentieth embodiment, and said network element is an intelligent network platform. A twenty-eighth embodiment includes the steps described in the twentieth embodiment, and said platform-based service is a supplementary service.

A thirtieth embodiment includes an outgoing-call handling apparatus, said apparatus comprising: a network element; a mobile station; wherein said network element is programmed to store telephone numbers and corresponding names, to recognize said names when spoken, to answer and connect incoming calls, to receive and evaluate commands from said incoming calls, and to send at least one command signal to the connected calls; and wherein said mobile station is programmed to receive at least one command signal from said network element and to carry out calling functions corresponding to said command signals. A thirty-first embodiment includes the apparatus of the thirtieth embodiment wherein said command signal comprises at least one of: first data corresponding to a telephone number, a control signal, and a second data corresponding to a network element callback number. A thirty-second embodiment includes the apparatus of thirtieth embodiment wherein said network element is a platform. A thirty-third embodiment includes the apparatus of the thirty-second embodiment wherein said network element is coupled to a public telephone network. A thirty-fourth embodiment includes the apparatus of the thirty-fourth embodiment wherein said public telephone network is a public switched telephone network. A thirty-fifth embodiment includes the apparatus of the thirty-third embodiment wherein said public telephone network is a integrated services digital network. A thirty-sixth embodiment includes the apparatus of the thirty-fourth embodiment wherein said mobile station comprises a subscriber identity module. A thirty-seventh embodiment includes the apparatus of the thirtieth embodiment wherein said network comprises an intelligent network platform.

A thirty-eighth embodiment includes an outgoing-call handling method, said method carried out by a communications device and a platform, said method comprising the following steps: a) the communications device receiving an attention signal from a user of the communications device; b) the communications device calling the platform; c) the platform answering the call; d) the platform sending a greeting; e) the communications device receiving a greeting from the platform; f) the communications device receiving a user command from the user; g) the communications device communicating said user command to the platform; h) the platform sending a command signal corresponding to said user command to the communications device; i) the communications device receiving said command signal; j) the communications device carrying out a function corresponding to said command signal. A thirty-ninth embodiment includes the steps described in the thirty-eighth embodiment, and said communications device is a mobile station.

The apparatus and process described below is for use in a Global System for Mobile (GSM) standard cellular system network, but the invention may be used in non-GSM networks, such as an Integrated Services Digital Network (ISDN), as well. Embodiments according to present invention are disclosed herein in reference to GSM because GSM is one of the most popular standards for cellular radio and telecommunications. GSM is described generally in Theodore S. Rappaport, *Wireless Communications* (1996), and William C. Y. Lee, *Mobile Cellular Telecommunications* (2d ed. 1995), which are incorporated herein by reference.

FIG. 1A is a high level functional block diagram of an embodiment according to the present invention. The apparatus or system shown in FIG. 1A includes a communications device, in this case a mobile station 1, or handset, a base transceiver station (BTS) 4, a base station controller (BSC) 6, a network switching subsystem (NSS), and an network element 8,. The preferred embodiment employs a mobile telephone as a communications device, but other telephones and devices may be used, such as land-line telephones, computers, or other devices. The network element 8 shown is an intelligent network platform (IN platform). Network elements that may be used are elements such as a Service Control Point (SCP), Service Node (SN), Advanced Intelligent Network (AIN), Intelligent Peripherals (IPs) or other network element.

The mobile station comprises mobile equipment and a subscriber identity module (SIM). The SIM is capable of storing a default telephone number for the IN platform. The mobile station 1 shown in FIG. 1A is capable of communicating using the GSM standard. The mobile station 1 communicates with the BTS 4, also known as a cell. This communication is accomplished using radio-frequency signals in conventional fashion or as otherwise desired or accomplished as desired. The BTS 4 in turn communicates with a BSC 6 in conventional fashion or as otherwise desired. The BSC 6 may control and communicate with several BTSs.

The BSC in turn communicates with Network Switching Subsystem (NSS) 9 in conventional fashion or as otherwise desired The NSS 9 comprises a Mobile Switching Center (MSC) (not shown), which governs the platform's communication with public telephone networks and which coordinates call set-up to and from mobile stations using the GSM standards. The NSS 9 also comprises a Home Location Register (HLR) and a Visitor Location Register (VLR) (not shown). The HLR comprises a computer, including a database storing subscriber information and current-location information for each user who resides in the MSC's city or surrounding area. The VLR comprises a computer, including a database temporarily storing subscription data then needed by the MSC. For example, the VLR stores customer information for a roaming subscriber who is temporarily in the coverage area of the MSC.

The NSS 9 communicates with an IN platform 8 using radio-frequency signals in conventional fashion or as otherwise desired or accomplished as desired. The NSS 9 is coupled with a network, such as the Public Switched Telephone Network (PSTN), Integrated Services Digital Network (ISDN), or other data networks (not shown), thus allowing communication between the mobile station and devices connected to a public telephone network. The NSS 9 is shown connected with a PSTN 2.

Figure 1B:
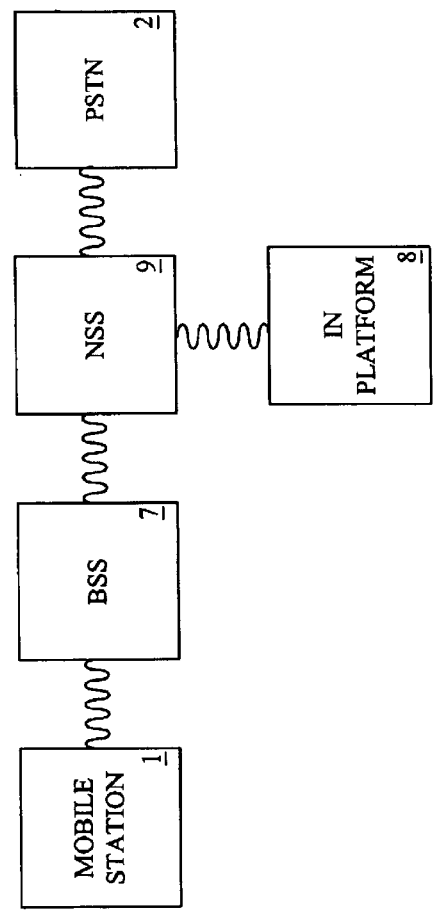
FIG. 1B is a block diagram of a base station subsystem according to a preferred embodiment of the present invention.

The BTS 4 and BSC 6 comprise the base station subsystem 7 (BSS) as shown in FIG. 1B. The mobile station thus normally communicates with the IN platform 8 through the BTS 4, BSC 6, and NSS 9, i.e., through the BSS 7 and NSS 9. For convenience, this disclosure of the embodiments according to the present invention describe the mobile station's communication with the IN platform, rather than the mobile station's communication with the BTS, the BTS's communications with the BSC, the BSC's communication with the NSS (or the BSS's communication with the NSS), and the NSS's communication with IN platform. It would be recognized by one of ordinary skill in the art that communication between a mobile station and an IN platform often occurs through other structure, such as a BTS, BSC, and NSS.

The IN platform 8 according to the present invention includes voice-recognition hardware, memory or database which is capable of storing telephone numbers and corresponding names, and hardware that is capable of sensing the current status of a call to the platform and of assigning a platform-callback number that will return the caller to that status when called. Such hardware, memory, or database may include a microprocessor. The IN platform 8 has a first preselected set of telephone numbers which, when called, cause the caller to receive a greeting and be presented with a selection of command options. The IN platform 8 has a second preselected set of telephone numbers which, when called, cause the caller to be placed in a particular or preselected operation state within the platform operation structure.

The present invention allows call control to be passed between a communications device, such as a mobile station or a landline telephone, and a network element, such as an IN platform. FIGS. 2A–2K and FIGS. 3A–3B are flowcharts showing an embodiment of the present invention in detail. The flowcharts show an embodiment according to the present invention beginning from various initial states of the mobile station. The flowcharts in FIGS. 2A–2K describe the operation of the mobile station, or handset, during the carrying out of an embodiment of the present invention. The flowcharts in FIGS. 3A–3B describe the operation of the IN platform during the carrying out of an embodiment of the present invention. The mobile station and the IN platform take the steps shown in FIGS. 2A–2K and FIGS. 3A–3B in cooperation with each other to carry out the preferred embodiment of the present invention. The embodiment shown therein is described below.

Figure 2A:
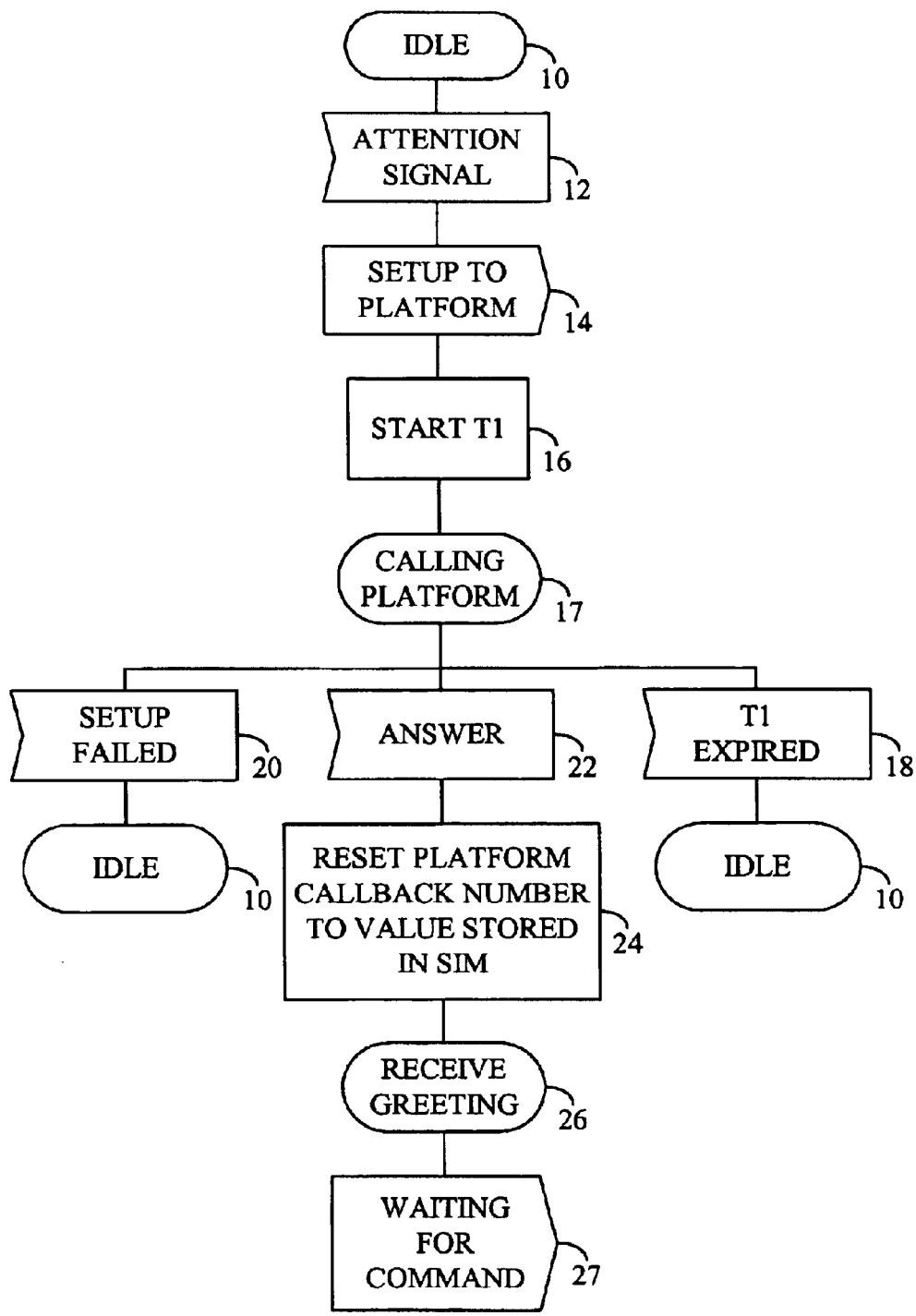
FIG. 2A is a flow chart illustrating a first portion of an embodiment of processes according to the present invention.

FIG. 2A shows an embodiment according to the present invention with the mobile station beginning from idle mode. In idle mode, the mobile station is on, but there are no active, held, or pending calls.

Referring to FIG. 2A, in the process shown, the mobile station is idle 10. In a preferred embodiment, the user of the mobile station provides an attention signal, e.g., a phrase such as "Attention" or "PowerCall," by, for example, speaking, and the mobile station detects the spoken signal 12. In another embodiment, the use of a spoken attention signal may be replaced with another action or attention signal, such as pressing a button on a mobile station's keypad. The mobile station then initiates a call to a IN platform 14 and starts a timer 16, designated T1. The call is made to the telephone number that is then designated as the platform callback number (or platform call number). At this point, the mobile station is in idle mode, in that it has no active connections, and is attempting to call the platform 17. The timer T1 shown in 16 governs the amount of time the mobile station will wait for the IN platform to answer. The timer T1 expires in a predesignated amount of time, preferably 3–6 seconds. If the timer T1 expires 18 before the platform answers, the mobile station will return to idle mode 10. Similarly, if the call attempt fails for some other reason 20, the mobile station will return to idle mode 10. If the platform answers 22 the mobile station's call, the mobile station will reset the platform callback number to a number stored in the mobile station's SIM 24. The platform's step of detecting the incoming call from the mobile station 502 and answering the call 504 is shown in FIG. 3A. Referring again to FIG. 2A, at this point, and at all other points in which the callback number is reset described herein, the mobile station may reset the platform callback number to a number stored elsewhere or a number communicated to it, but in the preferred embodiment, the number is retrieved from the mobile station's SIM. The next time the mobile station calls the platform, the mobile station will call this designated number. After the callback number is reset, the platform sends (or plays) a greeting to mobile station, e.g., "Hello, how can I help you?," (which is shown in FIG. 3A as step 506), and the mobile station receives the greeting 26 and accordingly the mobile station user hears the greeting. This greeting is carried via a voice-carrying connection between the platform 8 and the mobile station 1.

Figure 2B:
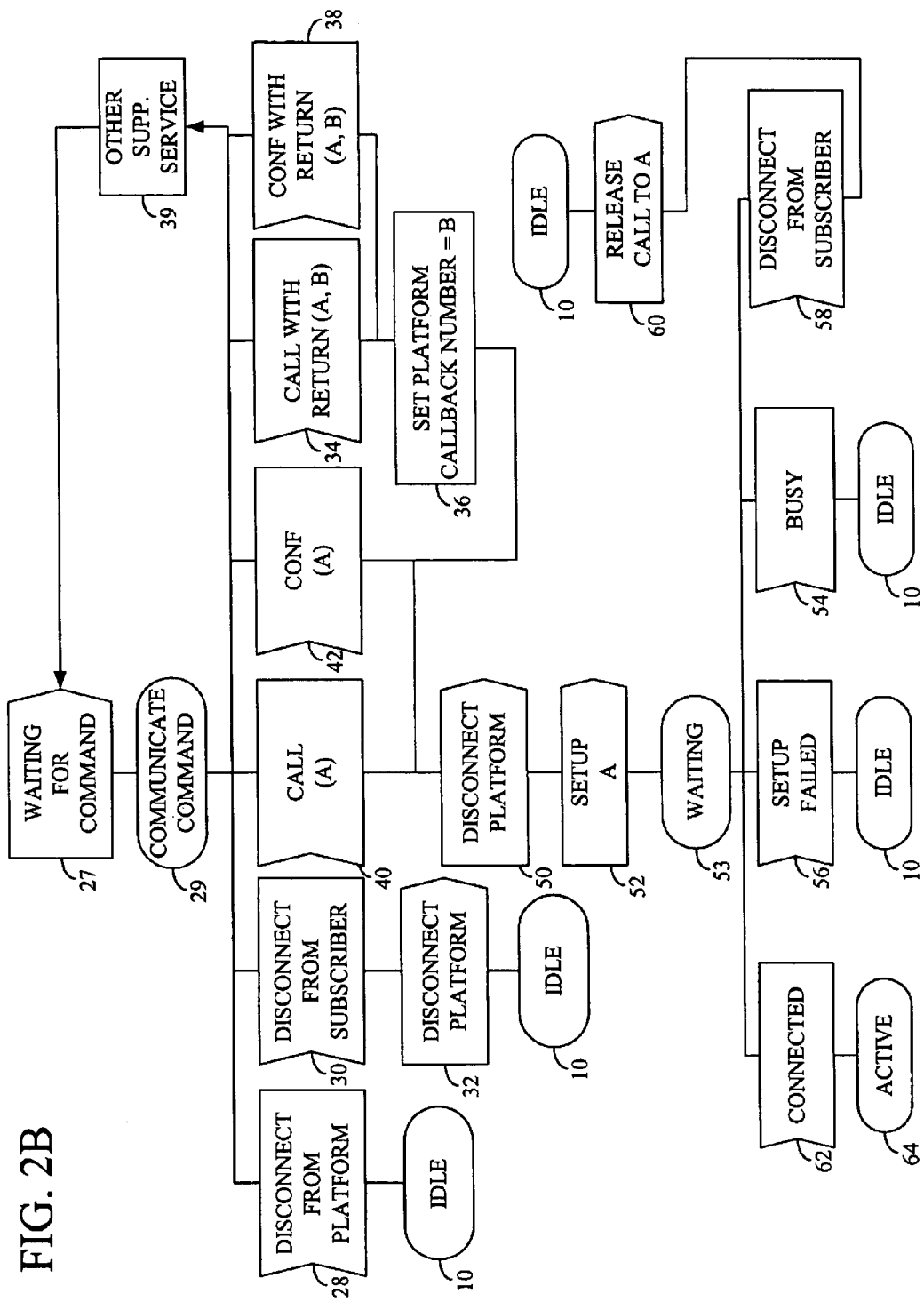
FIG. 2B is a flow chart illustrating a second portion of an embodiment of processes according to the present invention.

Once the mobile station receives the greeting 26 and the user hears the greeting, the mobile station waits to receive a command according to the present invention from the mobile station user 27. The command is preferably a voice command, but can comprise other forms, such as touch-tone, designated sounds, or data. At this time, the platform waits to receive a command from the mobile station as shown as step 508 in FIG. 3A. Referring to FIG. 2B, the mobile station communicates the received command to the platform 29. This communication is preferably accomplished via a voice-carrying connection between the platform and the mobile station. Once the platform receives the voice command (shown as step 510 in FIG. 3A), the platform evaluates the voice command (shown as step 512 in FIG. 3A).

Services provided by the IN platform (or similar network element) are generally referred to as platform-based services. Such services include services such as messaging-based services, calling services, and supplementary services.

The service requested could be one or more of a variety of services. The service requested could be a call-processing service, in which the user desires to make a call or desired to utilize an available supplementary service, e.g., call waiting, call conferencing, call transfer, and call forwarding. In some instances the mobile station returns control over calls and other matters to the platform after a call ends and in some instances the mobile station retains control over calls and other matters.

If the service requested is to be provided by the platform, the platform signals the mobile station with a command signal (shown as step 514 in FIG. 3A). Preferably, the command signal is signaled using GSM Unstructured Supplementary Service Data (USSD). USSD is described generally in European Telecommunications Standards Institute, *GSM 02.90: Digital Cellular Telecommunications System; Unstructured Supplementary Service Data (USSD)—Stage* 1 (Version 5.0.0 November 1996) (Reference: TS/SMG-010290Q); European Telecommunications Standards Institute, *GSM 03.38: Digital Cellular Telecommunications System (Phase 2+); Alphabets and Language-Specific Information* (Version 5.3.0 July 1996) (Reference TS/SMG-040338QR2); and European Telecommunications Standards Institute, *GSM 03.90: Digital Cellular Telecommunications System; Unstructured Supplementary Service Data (USSD)—Stage* 2 (Version 5.0.0 December 1996) (Reference TS/SMG-030390Q). Other methods, though, such as dual-tone multi-frequency (DTMF) may be used in the place of USSD in carrying out the present invention. The command signal preferably includes telephone number information, platform callback number information, and a control signal directing the action the mobile station is to take in response to the user's voice command. The command signal tells the mobile station the function that the mobile station is to carry out.

If the service requested is to be provided by the platform, preferably the voice-carrying connection between the mobile station and the platform will remain connected. This will enable the mobile station user to send commands (typically voice commands or DTMF commands) directly to the platform. Other types of connections may be used and sustained.

Once the command signal is communicated to the mobile station, the platform disconnects 518. This disconnect frees up platform resources to be used during other calls.

The shown embodiment shows call conferencing as one example of a supplementary service. The command may be to enter a supplementary service offered by the platform other than call conferencing, which is shown. One example of such a service is voice-mail service. If the command is to enter a supplementary service other than the shown conferencing service 39, the mobile station will enter such a service, carry out steps according to that particular supplementary service, and will continue waiting for another command from the user 27. For example, the mobile station may enter and use voice mail. The mobile station will continue to monitor the user to determine if the user might provide another command, such as CALL(A) or another command described below. Other examples of supplementary services are call waiting, call conferencing, call transfer, and call forwarding.

The preferred embodiment shows entry into a supplementary service 39. Any platform-based service may be entered at the point shown in the preferred embodiment as entering supplementary service or regarding supplementary service.

In the shown embodiment, the call-processing command-signals that the mobile station may receive, and recognizes, comprise: CALL(A), CONFERENCE(A), ALL_WITH_

RETURN(A,B), and CONFERENCE_WITH_RETURN (A,B). A and B are parameters corresponding to telephone numbers. The CALL(A) command corresponds to commanding the mobile station to place an outgoing call to the number indicated by parameter A. The CONFERENCE(A) and CONFERENCE_WITH_RETURN(A) are specific examples of supplementary services. The CONFERENCE (A) command corresponds to commanding the mobile station to place an outgoing call to the number indicated by the parameter A and to incorporate the connection with A into a multi-party call.

The CALL_WITH_RETURN and CONFERENCE_WITH_RETURN commands are used when the mobile station is connected to the platform and has activated a call-processing service while involved in using a platform-based service, e.g., voice mail. The CALL_WITH_RETURN(A,B) command corresponds to commanding the mobile station to place an outgoing call to the number indicated by parameter A and to set the platform-callback number for the mobile station's next call to the platform to the number indicated by parameter B. The CONFERENCE_WITH_RETURN(A,B) command corresponds to commanding the mobile station to place an outgoing call to the number indicated by parameter A, to incorporate that connection into a multi-party call, and set the platform-callback number for the mobile station's next call to the platform to the number indicated by parameter B.

The "with return" portion of the commands signifies that the call or conference portion of the command is first carried out, and then, preferably after a pre-designated command is received from the user, the mobile station will return to operation point in the service in which the mobile station was involved before the user decided to initiate a CALL_WITH_RETURN or CONFERENCE_WITH_RETURN command. For example, the mobile station may call the platform at 404-555-1111, connect with the platform, enter a voice-mail system, and begin reviewing voice-mail messages. The user may have five voice-mail messages. After listening to the first message, a message from John Doe, the mobile station user may wish to immediately call John Doe, whose number is 404-555-2222. Moreover, the user may wish to return to the voice-mail system at exactly the point at which the user departed from the system, just before listening to the second message, following the user's conversation with John Doe and disconnection from John Doe. The user will give a voice command, e.g., "Return the Call." The platform has John Doe's name and telephone number stored in memory. The platform will send a CALL_WITH_RETURN(4045552222,4045551112) command to the mobile station. This directs the mobile station to call 404-555-2222. When the call to 404-555-2222 is finished, and the mobile station receives a command, e.g., "Return," the mobile station calls the platform back at 404-555-1112. When the platform receives a call from the mobile station at 404-555-1112, the platform returns the caller to the point at which the previous call to the platform was terminated or to some other selected point. The CALL_WITH_RETURN and CONFERENCE_WITH_RETURN commands, and all similar commands, are called "with-return" commands.

The commands discussed above are made using USSD. Each command is made using a USSD string, which the platform is preprogrammed to make and the mobile station is preprogrammed to recognize as instructing that it carry out the corresponding command. For example, a command to call 404-555-1212, i.e., a CALL(4045551212) command, will be made by the platform to the mobile station by transmitting the USSD string corresponding to that command, 01*4045551212# (with or in relation to the "call" command).

Referring to FIG. 2B, if, while waiting for a command, the mobile station disconnects from the platform 28, the mobile station returns to idle mode 10. Similarly, if, while waiting for a command, the mobile station senses that the platform has disconnected 30, the mobile station will disconnect from the platform 32, and return to idle mode 10.

If the mobile station receives a CALL(A) command from the platform 40, the mobile station disconnects the platform 50, and calls the number corresponding to the parameter A 52.

For example, if the mobile station receives a CALL (4045551212) command from the platform, the mobile station will disconnect the platform and place a call to 404-555-1212. Likewise, if the mobile station receives a CONF(A) command 42, the mobile station disconnects the platform 50, and calls the number corresponding to the parameter A 52.

If the mobile station receives a CALL_WITH_RETURN(A,B) command from the platform 34, the mobile station first sets the platform-callback number to the number corresponding to the parameter B 36. For example, if the mobile station receives a CALL_WITH_RETURN (4045552222, 4045551112) command, the mobile station will set the platform-callback number to 404-555-1112. Similarly, if the mobile station receives a CONF_WITH_RETURN(A,B) command from the platform 38, the mobile station first sets the platform-callback number to the number corresponding to the parameter B 36. Unless the platform call-back number is reset before the next call to the platform is made by the mobile station, the mobile station's next call to the platform will be to the number 404-555-1112. Like the steps above, following setting the platform-callback number 36, the mobile station disconnects the platform 50, and calls the number corresponding to parameter A 52.

Figure 2C:
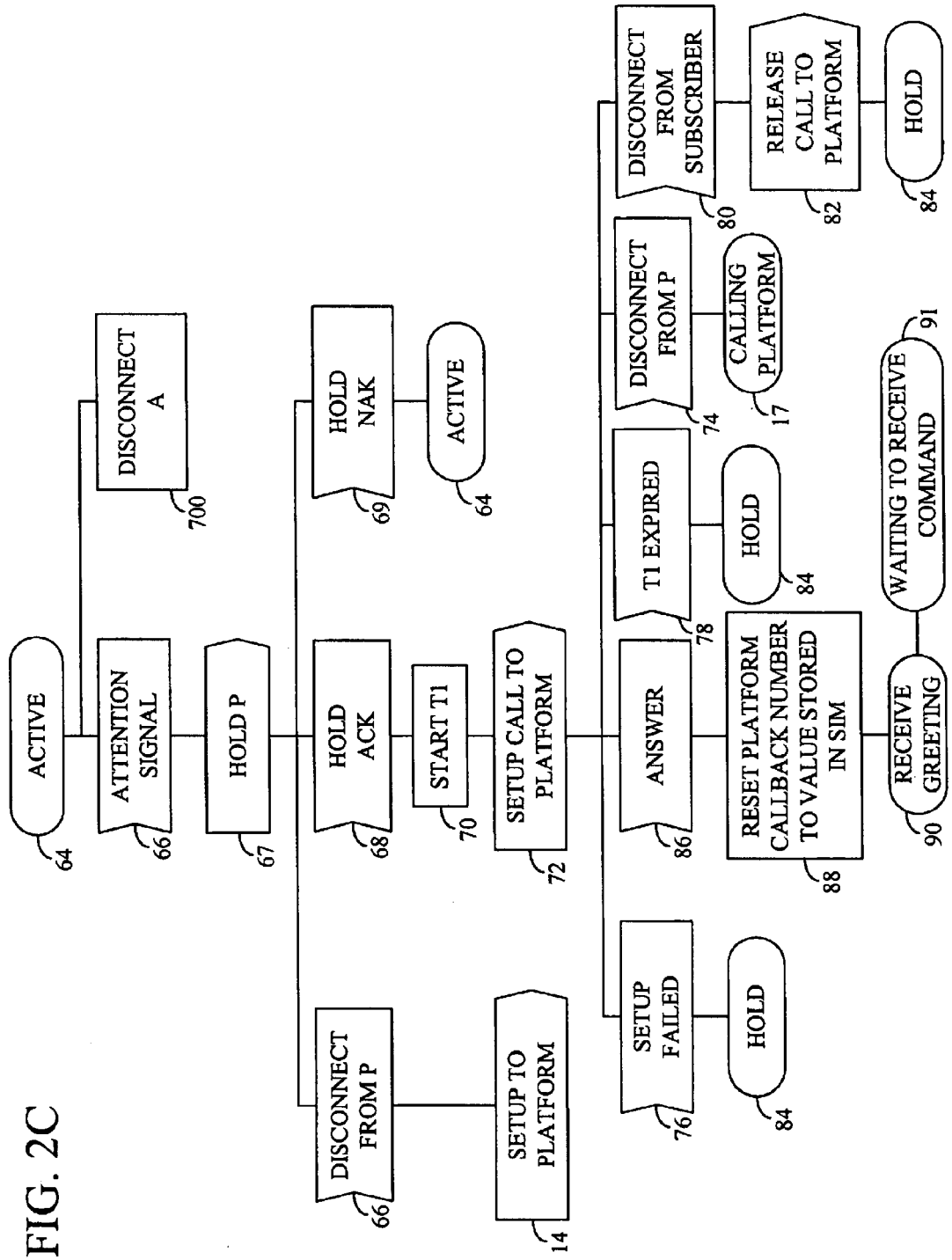
FIG. 2C is a flow chart illustrating a third portion of an embodiment of processes according to the present invention.
Figure 2E:
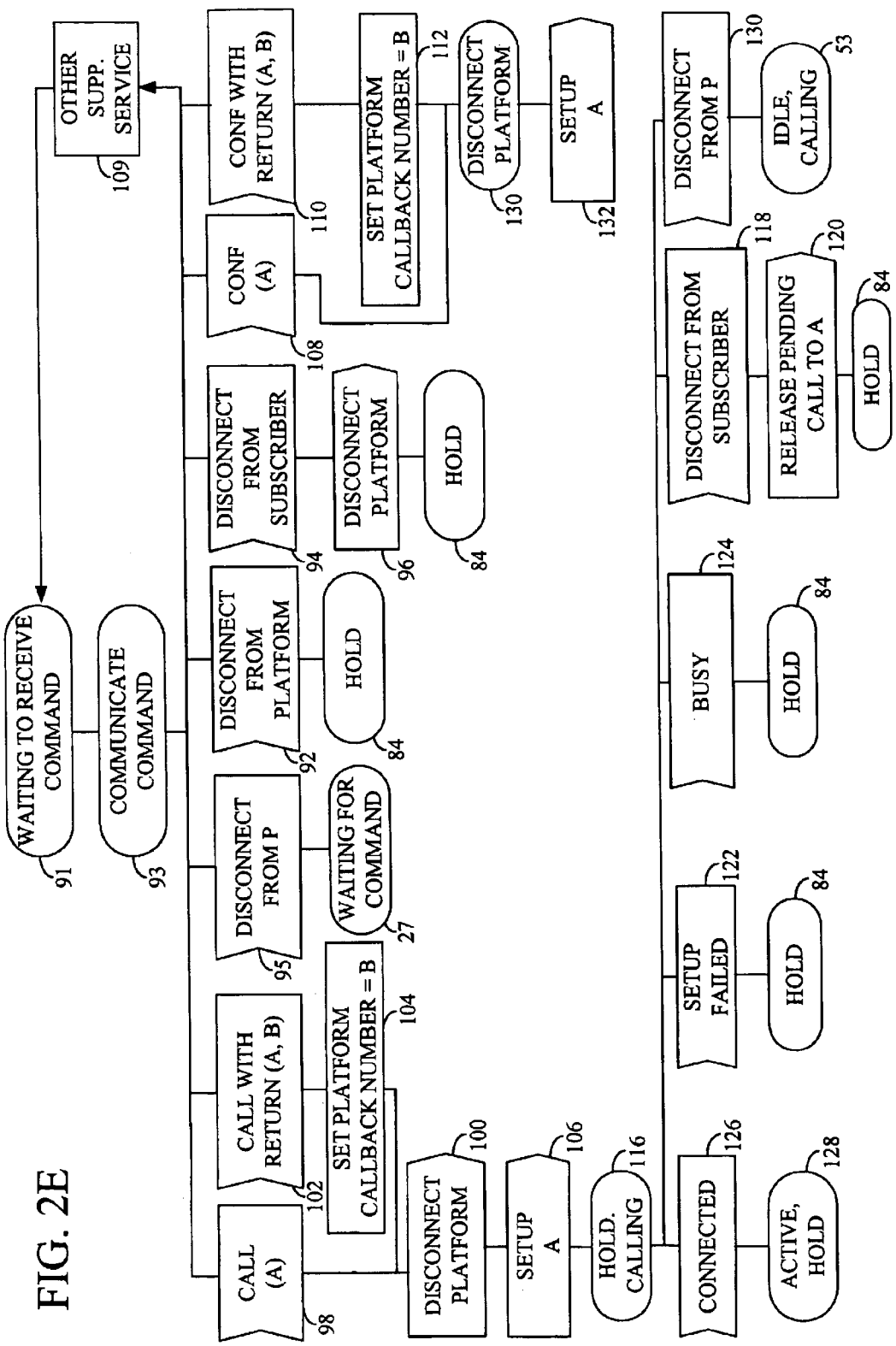
FIG. 2E is a flow chart illustrating a fifth portion of an embodiment of processes according to the present invention.
Figure 2F:
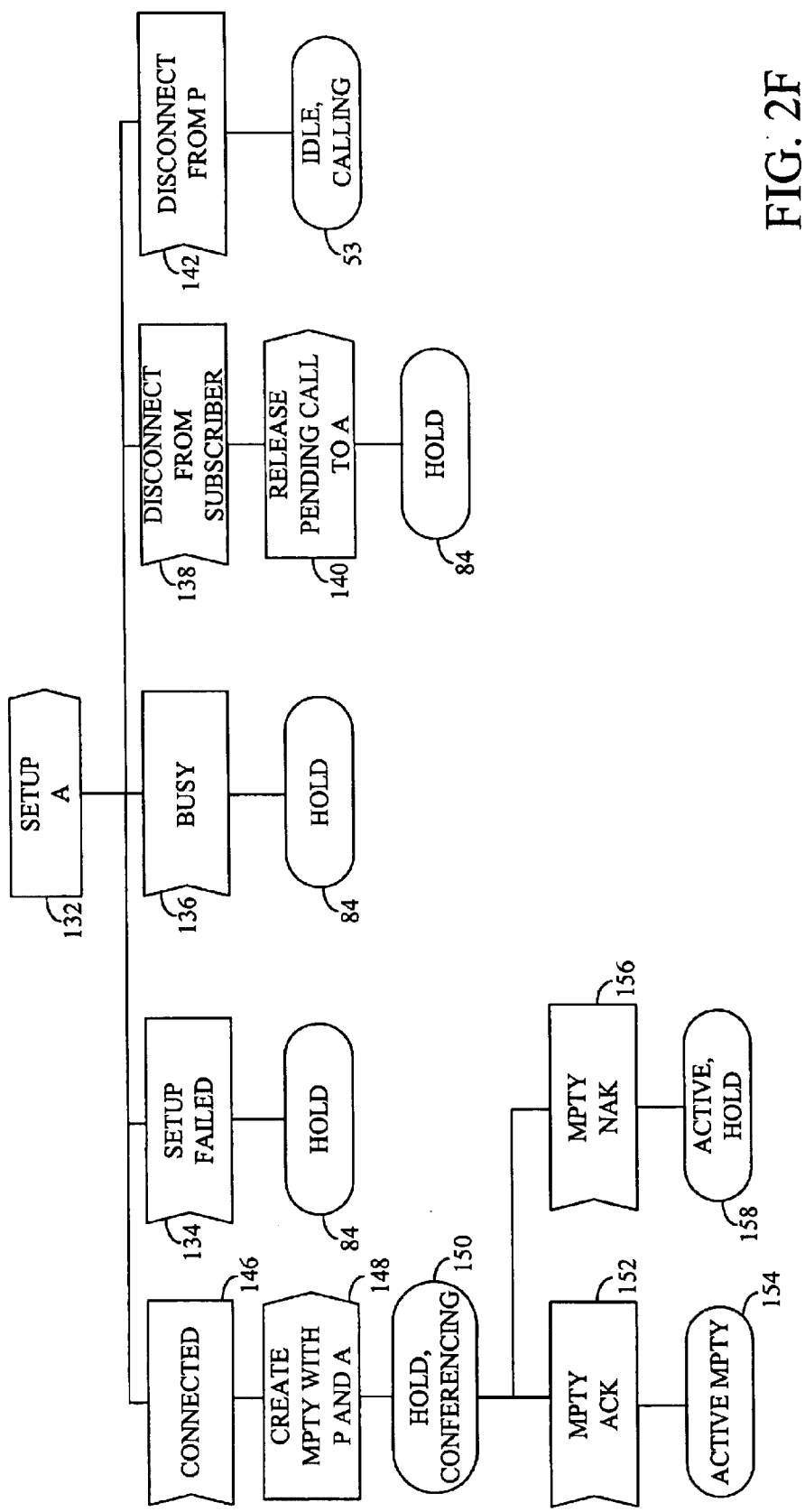
FIG. 2F is a flow chart illustrating a sixth portion of an embodiment of processes according to the present invention.
Figure 2G:
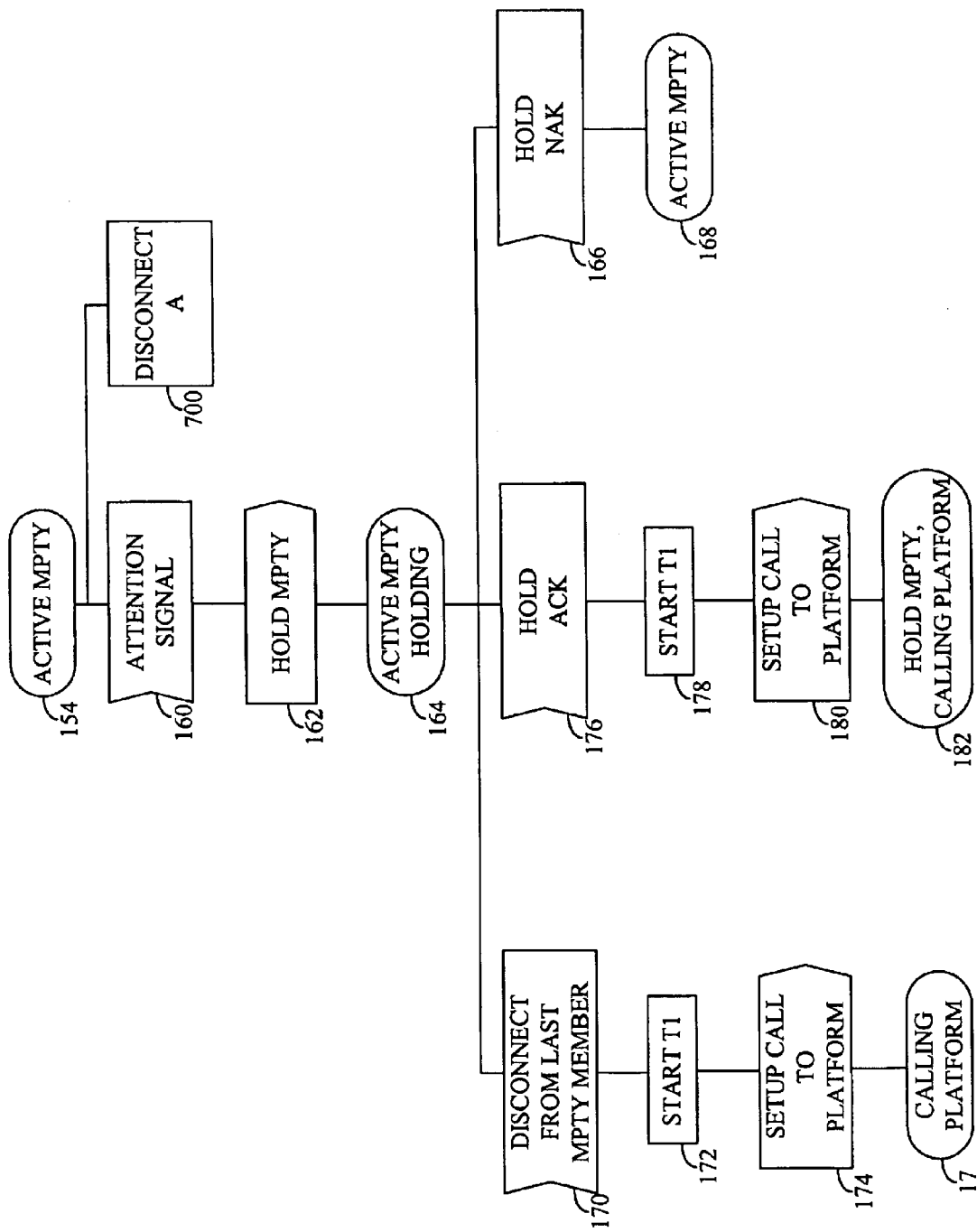
FIG. 2G is a flow chart illustrating a seventh portion of an embodiment of processes according to the present invention.
Figure 2H:
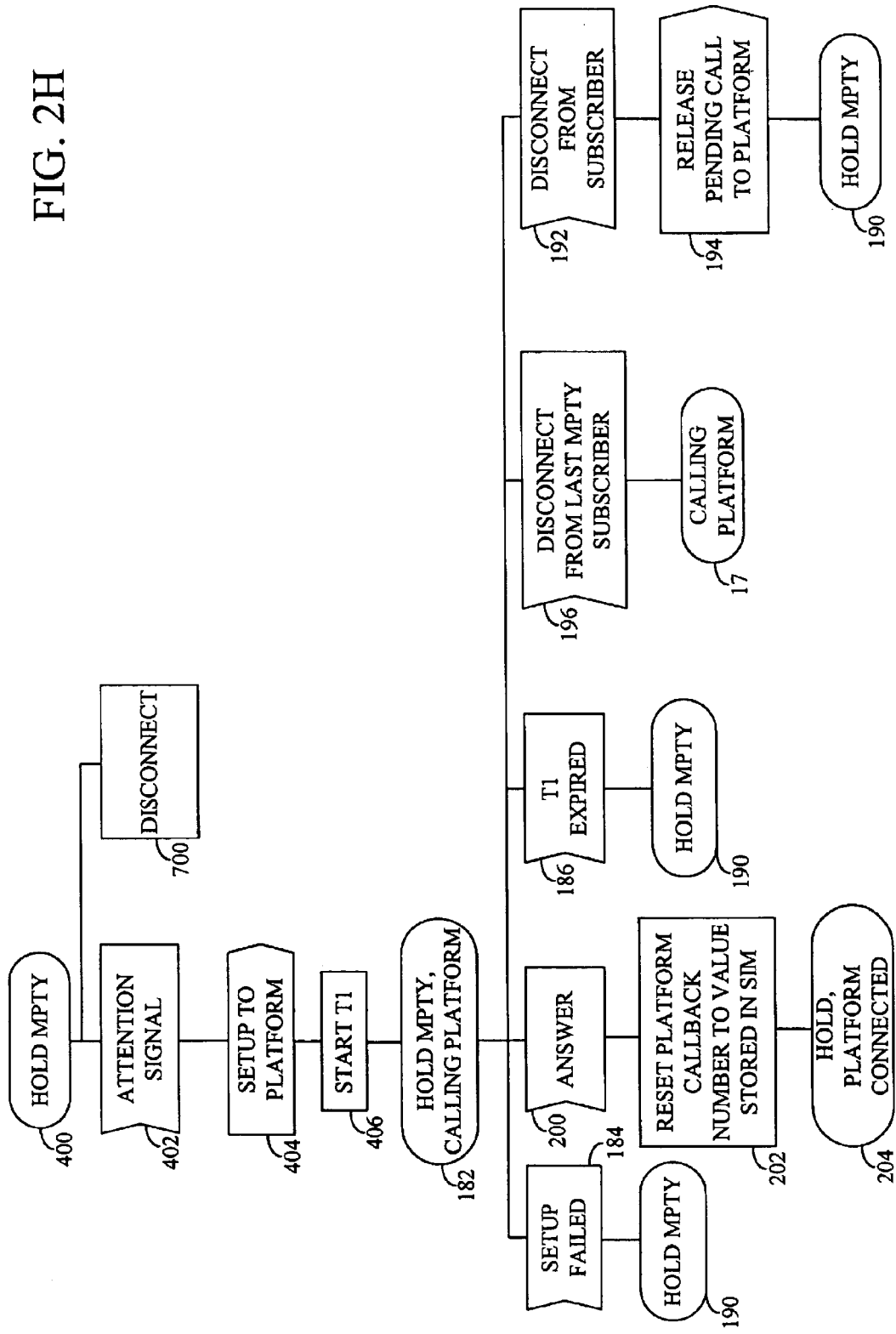
FIG. 2H is a flow chart illustrating a eighth portion of an embodiment of processes according to the present invention.
Figure 2I:
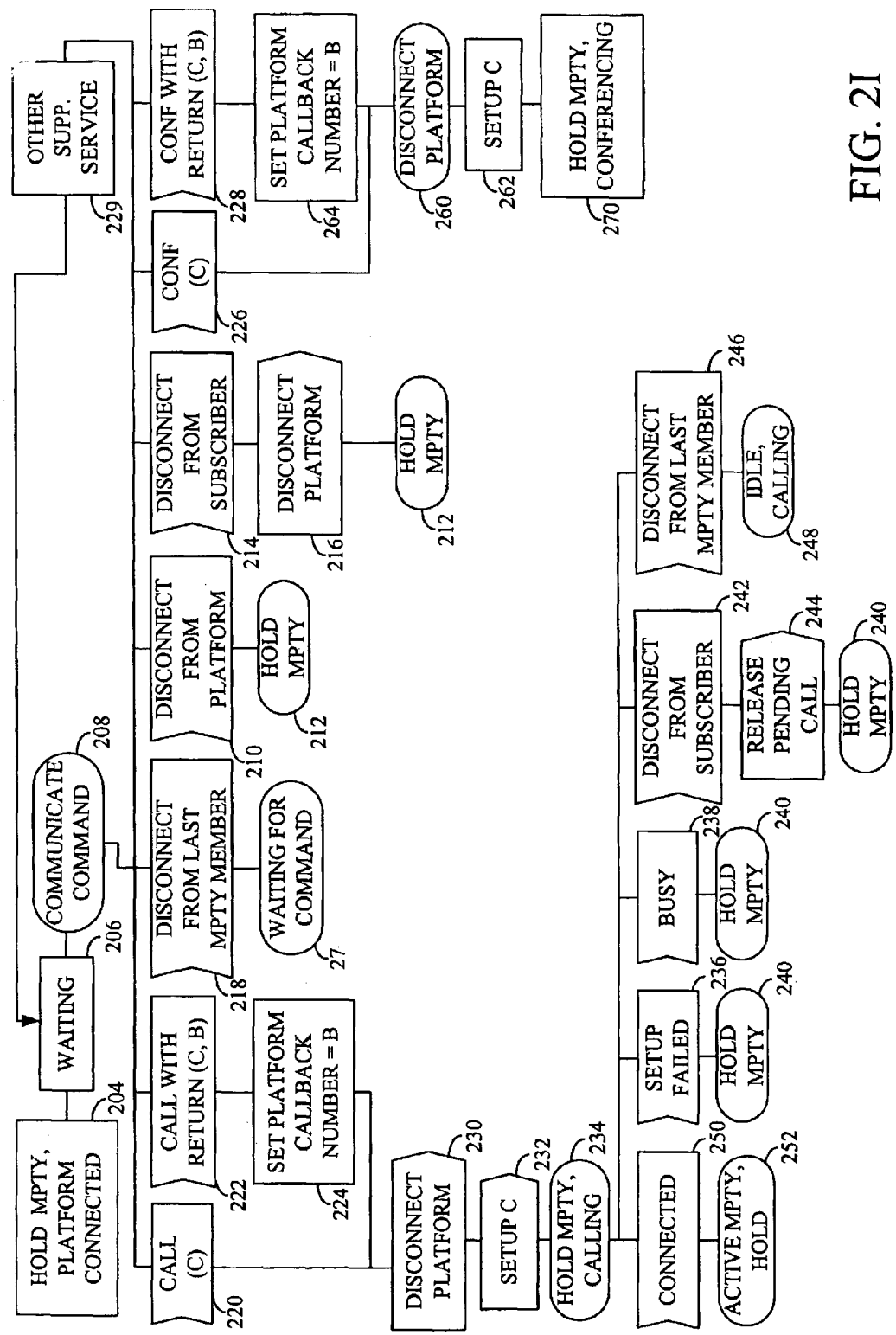
FIG. 2I is a flow chart illustrating a ninth portion of an embodiment of processes according to the present invention.
Figure 2J:
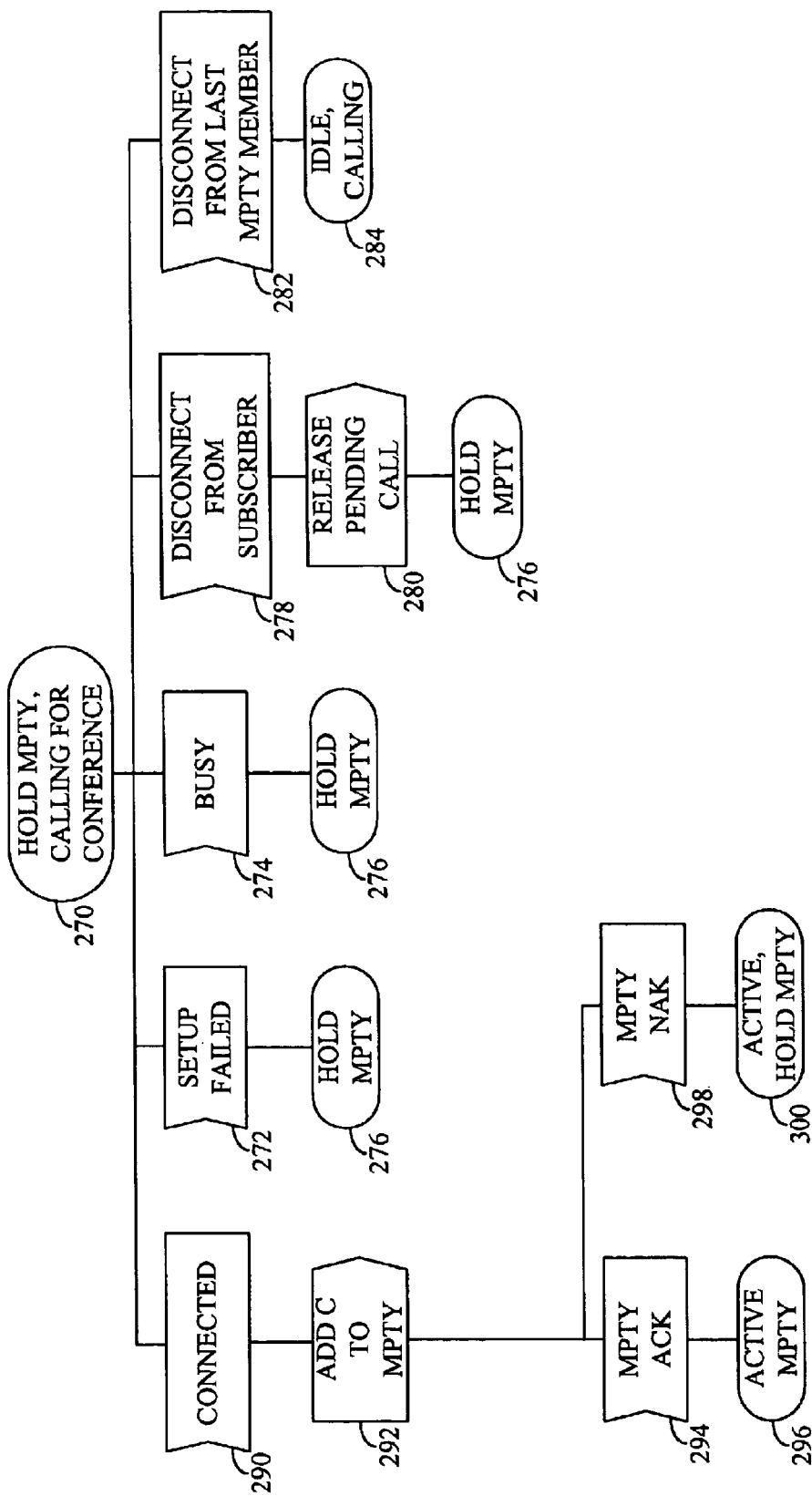
FIG. 2J is a flow chart illustrating a tenth portion of an embodiment of processes according to the present invention.
Figure 2K:
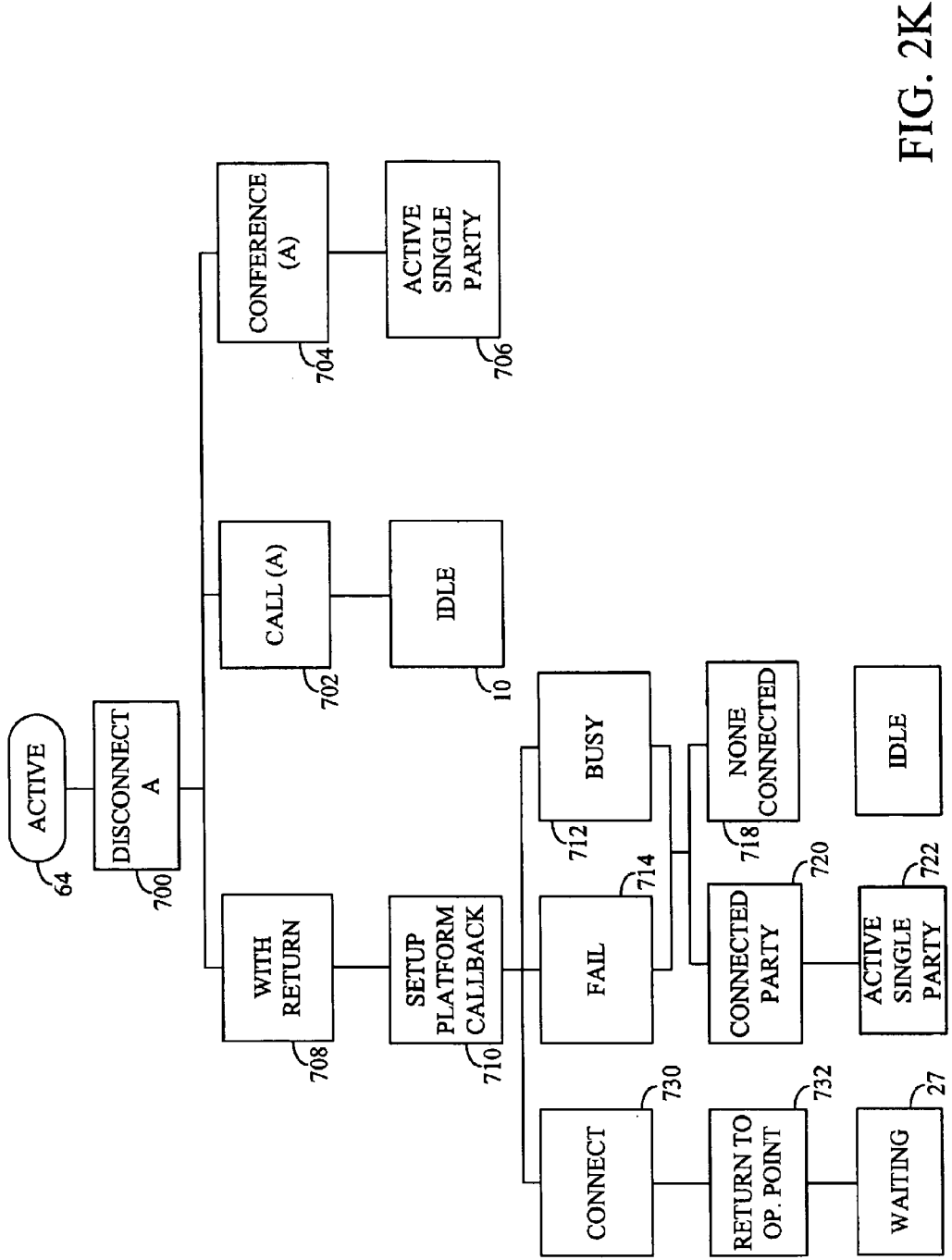
FIG. 2K is a flow chart illustrating a tenth portion of an embodiment of processes according to the present invention.

FIG. 2K illustrates the steps taken according to the present invention when a setup attempt is made to the platform at a platform callback number. The mobile station will setup a call to the number to which the platform callback number has been set 710 (designated B herein). If the call fails 714, or the number is busy 712, the mobile station will return to idle mode 10 if there is no other party connected with the mobile station 718. If there is another connected party 720, the mobile station will enter active single party mode with that connected party 722.

Referring to FIG. 3B, if the platform detects an incoming call to the callback number 602, the platform will answer the call 604. Referring again to FIG. 2K, if the call to the platform is successful 730, the mobile station will be returned to the operation point corresponding to the callback number 732. This is accomplished by operation of the platform (step 606 shown in FIG. 3B). Then, the mobile station will wait for a command 27, as shown in FIGS. 2A and 2B, and the platform will wait for a command from the mobile station 508, as shown in FIGS. 3B and 3A. The command from the mobile station is transmitted via the voice-carrying connection between the network platform and the mobile station. The mobile station will continue the process from step 27 as shown in FIG. 2B and the platform will continue from step 508 as shown in FIG. 3A.

Once the setup attempt begins 52, the mobile station waits to see the results of its attempt 53. If the number corresponding to parameter A is busy 54, or if the call of the number corresponding to parameter A fails 56 for some reason, the mobile station will return to idle mode 10. If the call to the platform is disconnected 58, the mobile station will release the call to A 60, and return to idle mode.

If the call to the number corresponding to parameter A is connected 62, the mobile station enters active mode with the call 64. In active mode, the mobile station is on and has an active, single party call. If the embodiment corresponding to the present invention reaches active mode 64, or idle mode after busy 54, setup failure 56, or disconnect from subscriber 58, after receiving a CALL_WITH_RETURN(A,B) or a CONF_WITH_RETURN(A,B) signal, the mobile station's next call to the platform will be to the number corresponding to the parameter B unless this callback-designation is altered.

Referring to FIG. 2K, if the mobile station is in active mode 64 with a call A, once the call is disconnected 700, whether by choice of one or both of the parties or other cause, the mobile station will then carry out the appropriate step. If the last command was a CALL(A) command 702, the mobile station will return to idle mode 10. If the last command was a CONFERENCE(A) command 704, the mobile station will return to active, single-party mode with the other connected party 706. If the last command was a "with return" command 708, the mobile station will setup a call to the IN platform at the platform callback number 710. If that callback number is busy 712, or the call fails 714, the mobile station will return to idle mode 10 if there are no other connected parties 718. If there is another connected party to the mobile station 720, the mobile station will enter single-party active mode with the connected party 722.

If the setup attempt to the platform at the callback number connects 730, and is thus successful, the mobile station will be placed at the operation point associated with the callback number used 732, preferably the last operation point at which the mobile station interacted with the platform. Subsequently, the mobile station will await a command 27, as shown in FIG. 2B, and the process will continue as shown in FIG. 2B.

Referring to FIG. 2C, when the mobile station is in active mode with one party, if the active party is disconnected 700, the mobile station will carry out the steps shown in FIG. 2K. After the disconnection 700, if the last command was CALL(A) 72, the mobile station will return to idle mode 10. If the last command was CONFERENCE(A) 704, and there is a remaining connected party, the mobile station will go into active mode with the connected party 706. If the last command was a "with return" command 708, the mobile station will call the platform at the platform callback number 710, B. If the connection to the platform is successful 730, the mobile station will return to the operation point at which the "with return" command was given 732 and will wait for further commands 27. If the attempt to call the callback number results in a failure 714 or a busy 712, the mobile station will return to idle mode 10 if no parties are connected 718 and will enter active mode 722 if parties are connected 720.

Step 700 is shown several times in the drawings. At each point, the above-described steps, as shown in FIG. 2K, are taken upon a disconnect 700.

Referring to FIG. 2C, when the mobile station is in active mode 64, the mobile station user may wish to undertake a call to another number. For purposes of setting forth an embodiment according to the present invention, the call with which the mobile station is in active mode with is designated "P". While in active mode with call P 64, the mobile station user provides an attention signal, by, for example, speaking an attention phrase, e.g., "PowerCall" or "Attention," and the mobile station recognizes such a signal 66. Other attention signals, such as pressing a designated button on the mobile station's keypad, may be used. Accordingly, the mobile station attempts to place the call with P on hold 67. If the hold attempt is not acknowledged 69, the mobile station remains in active mode 64.

If the connection between the mobile station and the call P is broken 66, referring to FIG. 2A, the mobile station will call the platform 14 and start a timer 16, designated T1. The embodiment according to the present invention then continues as shown in FIG. 2A.

If the hold attempt is acknowledged 68, and thus the hold is successful, the mobile station starts a timer 70, designated T1, and attempts to setup a call to the platform 72. The timer T1 shown in 70 governs the amount of time that the mobile station will wait for the platform to connect. If the mobile station is then disconnected from the call to P 74, referring to FIG. 2A, the embodiment according to the present invention goes to the step according to the step shown as 17 in FIG. 2A, calling platform. The embodiment continues with step T1 expired 18, setup failed 20, or Answer 22 shown in FIG. 2A. The embodiment then continues as shown in FIG. 2A.

If the mobile station is disconnected from the platform 80, the mobile station will release the call to the platform 82. If the setup attempt fails 76 or the timer T1 expires 78, or after the call to the platform is released 82, the mobile station is in hold mode 84, with the call designated as P on hold.

If the platform detects the incoming call (as shown at 502 in FIG. 3A) and answers (shown at 504 in FIG. 3A) and the mobile station connects with the platform 86, the mobile station resets the platform callback number 88. Preferably, the mobile station resets the platform callback number to a number stored in a mobile station SIM. At this point, the call P is on hold and the platform and the mobile station are connected. The platform sends a greeting to the mobile station, e.g., "Hello, how can I help you?," (shown at 506 in FIG. 3A) and the mobile station receives the greeting 90 and accordingly the mobile station user hears the greeting.

Once the mobile station receives the greeting 90, the mobile station waits to receive a voice command from the mobile station user 91. Referring to FIG. 3A, the platform waits to receive a command from the mobile station 508, preferably as a result of action by the mobile station user. Referring to FIG. 2E, the mobile station communicates the received command to the platform via the voice-carrying connection 93. Once the platform receives the voice command (shown at 510 in FIG. 3A), the platform evaluates the voice command (512 in FIG. 3A) and signals the mobile station with a command signal (514 at FIG. 3A). Preferably, the command signal is signalled using GSM Unstructured Supplementary Service Data (USSD).

If the command is to enter a supplementary service 109 other than the CALLBACK services shown, such as voice-mail, the mobile station will enter the corresponding supplementary service. Then, the mobile station will continue waiting for a command 91, and the process will continue as shown in FIG. 2E.

If the platform disconnects from the mobile station 94, the mobile station will disconnect its call to the platform 96, and will go into hold mode 84, with the call designated P on hold. Likewise, if the mobile station disconnects from the platform 92, the mobile station will go into hold mode 84. If the call to P is disconnected 95, the mobile station will be waiting for a command 27, as shown in FIG. 2E and FIG. 2A, and the process will continue as shown in FIG. 2A and 2B.

If the mobile station receives a command of CALL(A) 98 from the platform, the mobile station disconnects the platform 100 and begins to setup a call to the number corresponding to the parameter A 106. If the mobile station receives a command of CALL_WITH_RETURN(A,B) 102, the mobile station sets the platform callback number to the number corresponding to the parameter B 104, and then disconnects the platform 100, and begins to setup a call to the number corresponding to parameter A 106. At this point, the call P is on hold and the mobile station is waiting to see the results of its setup attempt 116.

If the platform disconnects from the mobile station 118, the mobile station releases the pending call to the number corresponding to the parameter A 120 and goes into hold mode 84, with the call P on hold. If the setup fails 122 or the mobile station receives a busy signal from the number A 124, the mobile station likewise goes into hold mode 84, with the call P on hold.

If the call to A is connected 126, and is thus successful, the mobile station is in active mode with the call to A, and has the call designated P on hold. If, during the call attempt to A, the call to P disconnects 130, referring to FIG. 2E and FIG. 2B, the mobile station continues to attempt the setup with A 53. Referring to FIG. 2B, the embodiment according to the present invention herein described continues as shown from the step designated 53 as shown in FIG. 2B.

Referring to FIG. 2E, if the mobile station receives a CONF_WITH_RETURN(A,B) command 110, the mobile station will set the platform callback number to the number corresponding to the parameter B 112. Subsequently, or after receiving a CONF(A) command 108, the mobile station disconnects the platform 130, and begins to setup a call to the number corresponding to the parameter A 132.

Referring to FIG. 2F, if, once the mobile station begins to setup a call to the number corresponding to the parameter A 132, the setup attempt fails 134 or a busy signal is received 136, the mobile station will go into hold mode 84, with the call P on hold. Likewise, if the subscriber disconnects 138, the mobile station releases the pending call to A 140 and goes into hold mode 84. If the call P disconnects 142, referring to FIG. 2B, the mobile station waits to see the results of its attempt to setup a call with A 53. The steps of the embodiment according to the present invention continue from 53 as shown in FIG. 2B.

If the mobile station and the call to A are connected 146, and the setup attempt is thus successful, the mobile station attempts to put the mobile station, the connection with A, and the connection with P in a multi-party connection 148. The mobile station then waits 150 to see if the multiparty attempt is acknowledged (and is thus successful) or is not acknowledged. If the multi-party attempt is acknowledged 152, the mobile station is in active multi-party mode, with the mobile station, the connection with A, and the connection with P in multi-party, active connection 154. If the multi-party attempt is not acknowledged 156, and thus fails, the mobile station is in active mode with the connection with A, and retains the connection with P on hold 158.

Referring to FIG. 2G, if the call to A is disconnected 700, whether purposefully or not, the mobile station will carry out the steps shown in FIG. 2K after step 700. If the last command was a "with return" command 708, the mobile station will setup a call to the platform at the platform callback number last set 710. If this connection is made 730, the mobile station will return to its last operation point 723 and will wait for further commands 27.

Again referring to FIG. 2G, if the mobile station is in active multi-party mode, the mobile station user may speak an attention phrase, e.g., "PowerCall." The mobile station recognizes the attention phrase 160 and attempts to put the multi-party connection on hold 162. At this point, the mobile station is still in active multi-party mode 164. If the hold attempt is not acknowledged 166, and is thus unsuccessful, the mobile station remains in active multiparty mode with A and P 168.

If both A and P disconnect from the multi-party connection 170 while the mobile station attempts to put the multiparty connection on hold, the mobile station will start a timer 172, designated T1, and attempt to setup a call to the platform 174. The timer T1 shown in 172 governs the amount of time the mobile station will wait for the platform to connect. Preferably, the timer T1 expires in 3–6 seconds. At this point, the mobile station is in idle mode in that it has no active connections, and is attempting a call to the platform 17. Referring to FIG. 2A, the embodiment according to the present invention continues from this point 17 as shown in FIG. 2A.

Referring to FIG. 2G, if the hold attempt is acknowledged 176, the mobile station starts a timer 178, designated T1, and attempts to setup a call to the platform 180. The timer T1 shown in 178 governs the amount of time that the mobile station will wait for the platform to connect. Preferably, the timer T1 shown in 178 expires in 3–6 seconds. At this point, the mobile station has multiple parties on hold (A and P) and is attempting a call to the platform 182.

Referring to FIG. 2H, the embodiment according to the present invention continues at the step shown at 182 in FIG. 2H. If the setup attempt fails 184 or the timer T1 expires 186, the mobile station is in held multi-party mode 190, with both A and P on hold. If the platform and the mobile station are disconnected 192, the mobile station releases the pending call to the platform 194, and the mobile station is in held multi-party mode 190. If A and P disconnect from the mobile station 196, the mobile station is in idle mode, with no connected call, and continues to attempt the call to the platform 17. From the step shown at 196 in FIG. 2H, the embodiment according to the present invention continues to attempt to call the platform 17 as shown in FIG. 2A. The embodiment according to the present invention continues from step 17 as shown in FIG. 2A and as described above.

If the platform answers the mobile station's call and the mobile station is connected to the platform 200, the mobile station resets the platform callback number 202 to the value stored in the mobile station's SIM. At this point, the mobile station has its connection with A and P in multi-party hold and is connected with the platform 204 and awaits a command 206.

Referring to FIG. 2I, once the platform is connected, the mobile station receives a greeting from the platform, e.g., "Hello, how can I help you?" At this point, the user may, or may not, elect to examine voice mail or undertake some other platform-based service. The user of the mobile station may speak a voice command and the mobile station communicates this voice command to the platform 208. This voice command may be, for example, "Call Jane Doe at work" or "Conference Jane Doe at work." If the user is examining voice mail, the voice command may be, for example, "Return the Call" or "Return the Call and Conference." As explained above, once the platform receives the voice command, the platform evaluates the voice command and signals the mobile station with a command signal. Preferably, the command signal is signalled using USSD. The command signal includes both telephone number information and a control signal directing the action the mobile station is to take in response to the user's voice command.

The command signal received by the mobile station determines what action the mobile station next takes.

If the user elects to enter supplementary services other than the conference service as described, such as voice mail, the mobile station will enter the selected supplementary service 229. Then, the mobile station will continue waiting for a command 206.

If the mobile station recognizes that the platform has disconnected 210, the mobile station is in held multi-party mode 212, with A and P in a multi-party call on hold. Likewise, if the mobile station recognizes that the user seeks to disconnect 214, the mobile station will disconnect its call to the platform 216, and go into held multi-party mode 212. If both parties to the multi-party call disconnect 218, the mobile station is then in idle mode, with no active calls, and is connected to the platform. Referring to FIG. 2B, the mobile station then waits to receive a voice command from the mobile station user 27. The embodiment according to the present invention then continues as shown from step 27 as shown in FIG. 2B.

If the mobile station receives a CALL(C) command from the platform 220, wherein the parameter C is the telephone number corresponding to the voice command given by the mobile station user, the mobile station will disconnect from the platform 230. If the mobile station receives a CALL_WITH_RETURN (C,B) command from the platform 222, wherein the parameter C is the telephone number corresponding to the voice command given the mobile station user and the parameter B is the platform callback number, the mobile station resets the platform callback number to the number corresponding to the parameter B 224, and then disconnects the platform 230.

The mobile station then attempts to setup a connection with the number corresponding to the parameter C 232. At this point, the mobile station has two call in multi-party hold and is waiting to see if its setup attempt is successful 234. If the setup attempt fails 236, or the mobile station receives a busy signal 238, the mobile station is in held multi-party mode 240, with the connection with A and P on hold. If the mobile station recognizes that the user seeks to disconnect 242, the mobile station will release the pending call to C 244, and will go into held multi-party mode 240. If both multi-party members disconnect 246, the mobile station is in idle mode, with no active calls, and continues to call C 248. Referring to FIG. 2B, the embodiment according to the present invention continues at step 53, wherein the call is being made to the number designated by C rather than by A.

Referring again to FIG. 2I, if the call to C is connected 250, the mobile station is in active statues with the call to C and has a multi-party connection with A and P on hold 252.

If, after the mobile station communicates this voice command to the platform 208, the mobile station receives a command from the platform of CONF(C) 226, the mobile station will disconnect the platform 260 and will attempt to setup a connection with the number corresponding to the parameter C 262. If, after the mobile station communicates this voice command to the platform 208, the mobile station receives a command from the platform of CONF_WITH_RETURN(C,B) 228, the mobile station will set the platform callback number to the number corresponding to the parameter B 264, disconnect the platform 260, and attempt to setup a connection with the number corresponding to the parameter C 262.

At this point, whether the command received was CONF (C) or CONF_WITH_RETURN(B,C), the mobile station has the multi-party connection on hold and is attempting to connect with the number corresponding to the parameter C 270. Referring to FIG. 2J, if the setup fails 272 or the mobile station receives a busy signal 274, the mobile station is in held multi-party mode 276, with the connection with A and P on hold. If the mobile station receives a disconnect command from the mobile station user 278, the mobile station will release the pending call to C 280, and will be in held multi-party mode 276. If the mobile station recognizes that both of the parties on multi-party hold disconnect 282, the mobile station will be in idle mode, with no connected calls, and will continue attempting to connect with C 284. Referring to FIG. 2C, the embodiment according to the present invention continues at step 53, wherein instead of calling the number corresponding to A as shown in FIG. 2C, the number being called is the number corresponding to C.

Referring again to FIG. 2J, if the call to C connects 290, the mobile station will attempt to add C to the multi-party connection 292. If the attempt to add C to the multi-party connection is acknowledged 294, and is thus successful, the mobile station will be in active multi-party mode with the numbers corresponding to A, P, and C 296. If the attempt to add C to the multi-party connection is not acknowledged 298, and thus fails, the mobile station will be in active mode with the call to C and will retain the multi-party connection with A and P on hold 300.

Referring to FIG. 2D, if the mobile station has one call, designated P, on hold 84, and the mobile station receives an attention signal from the mobile station user, e.g., the spoken word "PowerCall," 310, the mobile station will attempt to setup a connection with the platform 312. The mobile station will attempt to call the platform at the number that the mobile station last set as a callback number for the platform. The mobile station then starts a timer 314, designated T1. T1 shown in 314 governs the amount of time that the mobile station will wait for the platform to connect. Preferably, T1 expires after 3–6 seconds. At this point, the mobile station has a single call, P, on hold and is calling the platform at the current callback number 316.

If the setup fails 330, the mobile station will return to hold mode 320, with the connection with P on hold. Likewise, if the timer T1 expires 318, the mobile station will return to hold mode 320. If the mobile station is commanded to disconnect 322, the mobile station will release the pending call to the platform 324, and will return to hold mode 320. If the connection between the mobile station and P is broken 326, the mobile station will be in idle mode, with no connected calls, and will continue calling the platform 17. Referring to FIG. 2A, the embodiment according to the present invention continues as shown in FIG. 2A after step 17.

If the platform answers 332, the mobile station will reset the platform callback number 334 to the value stored in the mobile station's SIM. At this point, the mobile station has the connection with P on hold and is connected to the platform 90. Referring to FIG. 2C, the embodiment according to the present invention continues after step 90 as shown therein.

Referring to FIG. 2H, if the mobile station has a multi-party connection on hold 400 and receives an attention signal, e.g., the spoken word "PowerCall," from the mobile station user 402, the mobile station will begin attempting a call to the platform at the current platform callback number 404. After beginning 404, the mobile station starts a timer 406, designated T1. At this point, the mobile station has a multi-party connection on hold and is calling the platform 182. The embodiment according to the present invention continues after step 406 and step 182 as shown in FIG. 2H and as described above.

FIG. 3A shows the action of an intelligent network platform according to the present invention. As described above, the network element described herein as a preferred embodiment comprising an IN platform may be one of several types of network elements. The IN platform begins in idle mode 500, and is awaiting a call from the mobile station 10. The platform detects an incoming call 502 and answers that call 504. Once the call has been answered, the platform sends a greeting to the mobile station 506, e.g., "Hello, how can I help you?" After sending the greeting, the platform waits to receive a voice command signal from the mobile station 508. In the preferred embodiment, the command is a voice command. The command may be in another form, such as data or DTMF.

When a voice command is received 510, the platform will evaluate the voice command signal 512. The voice command may signal the platform to allow the caller to check platform-based voice-mail or to place the caller in another platform-based service, and the caller will be placed in that service 516. For example, the voice command may be "Voice Mail." In that instance, the platform will place the call in the voice-mail service 516. Once the caller is placed in the supplementary service 516, the platform will continue waiting for a command 508 while the caller uses the supplementary service.

The voice command may be to utilize a call-processing service. For example, if the voice signal received is "Call John Doe," the platform will search its memory in which telephone numbers and corresponding names are stored. If a number corresponding to "John Doe" is found, the platform will send an appropriate command signal to the mobile station 514. For example, if John Doe's stored number is 404-555-2222, the platform will send the command signal CALL(4045551212) to the mobile station. Preferably, the command signal CALL(4045551212) is sent using GSM USSD. Similarly, if the voice signal received is "Conference John Doe," the platform will send the command signal CONFERENCE(4045551212) to the mobile station.

If, during its evaluation of the command 512, the platform determines that a received voice command corresponds to a "with return" command, the platform will determine a platform call-back number that will return the caller to the operation point in the service in which the mobile station was involved at the time the user initiated the "with return" command. For example, CALL_WITH_RETURN and the CONFERENCE_WITH_RETURN commands are described above. The platform will send the corresponding signal to the mobile station 514. This corresponding signal will include platform call-back number which, when called, will allow the mobile station to return to the operation point in the service in which the mobile station was involved at the time the user initiated the "with return" command. After sending the appropriate signal to the mobile station 514, the platform will disconnect the call 518, and return to idle mode 500.

FIG. 3B shows the action of an intelligent network platform according to the present invention. Particularly, FIG. 3B shows the action of IN platform when the platform is called using a platform call-back number associated with allowing the mobile station to return to the operation point in the service in which the mobile station was involved at the time the user initiated a "with return" command. Referring to FIG. 3B, the platform begins in idle mode 600. When the platform detects an incoming call to the call-back number 602, the platform answers the call 604, and thus connects with the caller. Subsequently, the platform will place the caller to the operation point in the service 606 corresponding to the call-back number. Preferably, the call-back number will correspond to the point in which the mobile station was involved at the time the user initiated the "with return" command. For example, if the caller initiated a "with return" command after listening to the first voice mail in the platform's voice-mail system, the call-back number will correspond to returning the caller to that operation point and, when a call is received to that call-back number, the platform will return the caller to that operation point 606. Once the platform has placed the connection at the appropriate operation point 606, the platform will await a command 508 from the mobile station. Referring to FIG. 3A, the platform will continue as shown from step 508.

Multi-party conference calls in which there are more than three participants may be treated as a platform-based service or supplementary service in an embodiment of the present invention. That is, calls of four or more, e.g., four to six, participants would require that the mobile station be connected to the network platform. Then, the network platform would make the calls to other participants, rather than using a CALL(A) or CONFERENCE(A) command as described above. This is due to several practical considerations, the first of which is that conventional GSM phones and GSM NSSs do not support six-party multi-conferencing. Additionally, six-party multi-conferencing is typically a scheduled event rather than an impromptu event. Such multi-party conferencing is accommodated in the present invention.

In the present invention, a mobile station user can conference, or "bridge," two calls, e.g., call to A and call to B, without involving the platform. For example, the user can press the "Send" key and accomplish this bridging. This bridging may be used to, for example, enact a three-way call.

As mentioned above, the network element in the preferred embodiment is an IN platform. Preferably, it has the capability of supporting the USSD or other signalling command to a mobile station. Also as mentioned above, this network element could be a Service Node (SN), Service Control Point (SCP), Service Node (SN), Advanced Intelligent Network (AIN), Intelligent Peripherals (IPs) or other network element, including voice-mail platforming and voice-activated dialing platform.

The foregoing is provided for purposes of explanation and disclosure of a preferred embodiment of the present invention. Modifications of and adaptations to the described embodiment will be apparent to those of ordinary skill in the art of the present invention and may be made without departing from the scope or spirit of the invention.

We claim:

1. An outgoing-call handling method, said method carried out by an apparatus comprising a mobile station and an intelligent telecommunications network element, said method comprising the following steps:
   a) detecting an attention signal;
   b) calling the network element at a network element callback number;
   c) connecting with the network element;
   d) communicating a user command to the network element;
   e) receiving a command signal from the network element corresponding to said user command;
   f) disconnecting from the network element; and
   g) in a mobile station, carrying out a function corresponding to said command signal.

2. The method of claim 1 wherein step b is carried out in the mobile station.

3. The method of claim 2 wherein said command signal comprises at least one of: first data corresponding to a telephone number, a control signal, and second data corresponding to a network element callback telephone number.

4. The method of claim 3 wherein said function comprises connecting with the telephone number corresponding to said first data.

5. The method of claim 4 wherein said function comprises setting the network element callback number to the number corresponding to said second data in the event that said command signal comprises said second data.

6. The method of claim 5 wherein said function comprises setting the network element callback number to the number corresponding to said second data and connecting with the network element callback number upon disconnection with the telephone number corresponding to the first data in the event said control signal comprises a with-callback signal and said second data.

7. The method of claim 6 wherein said function comprises being placed at a operation point corresponding to the network element callback number called.

8. The method of claim 7 wherein said step of communicating a user command to the network element is carried out using a radio frequency signal.

9. The method of claim 3 wherein the function comprises calling the number corresponding to said first data in the event that said control signal signifies calling the number corresponding to said first data.

10. The method of claim 3 wherein the function comprises calling the number corresponding to said first data and placing said call in a multi-party connection with any other connected party in the event that said control signal signifies conferencing with the number corresponding to said first data.

11. The method of claim 3 wherein the function comprises connecting with the number corresponding to said first data and then calling the number corresponding to said second data upon disconnection from said connection in the event that said control signal signifies calling the number corresponding to said first data and then returning to the present operation point.

12. The method of claim 3 wherein the function comprises connecting with the number corresponding to said first data and including said connection in a conference call with all other connected calls in the event that said control signal signifies conferencing with the number corresponding to said first data.

13. The method of claim 1 wherein said network element is a platform.

14. The method of claim 1 wherein said network element is an intelligent network platform.

15. The method of claim 14 wherein said command signal comprises at least one of: first data corresponding to a telephone number, a control signal, and second data corresponding to a network element callback telephone number.

16. The method of claim 15 wherein said function comprises connecting with the telephone number corresponding to said first data.

17. The method of claim 1 wherein said network element comprises hardware that is capable of sensing a current status of a call to the network element and of assigning a platform-callback number that will return the mobile station to that status when called.

18. The method of claim 17 wherein said command signal comprises at least one of: first data corresponding to a telephone number, a control signal, and second data corresponding to a network element callback telephone number.

19. The method of claim 18 wherein said function comprises connecting with the telephone number corresponding to said first data.

20. An outgoing-call handling method, said method carried out by an apparatus comprising an intelligent telecommunications network element, said method comprising the following steps:
a) detecting an incoming call;
b) answering said call;
c) establishing connection with said call;
d) if said call is to one of a first set of preselected network element callback numbers, sending greeting to caller;
if said call is to one of a second set of preselected network element callback numbers, placing said connection at operation point within the network element operation corresponding to the called callback number;
e) waiting for command;
f) receiving command;
g) evaluating command; and
h) if said command corresponds to a command to enter a selected platform-based service, entering the selected platform-based service and returning to step e); and
if said command corresponds to a command to signal a command signal, sending a command signal corresponding to said command to the mobile station and disconnecting call.

21. The method of claim 20 wherein step b is carried out in said network element.

22. The method of claim 21 wherein said command signal comprises at least one of: first data corresponding to a telephone number, a control signal, and a second data corresponding to a network element callback number.

23. The method of claim 22 wherein said selected platform-based service is a voice-mail messaging service.

24. The method of claim 23 wherein said one of a second set of preselected network element callback numbers corresponds to an operation point within said voice-mail messaging service.

25. The method of claim 24 wherein said step of sending a command signal is carried out with a radio frequency signal.

26. The method of claim 20 wherein said network element is a platform.

27. The method of claim 20 wherein said network element is an intelligent network platform.

28. The method of claim 20 wherein said platform-based service is a supplementary service.

29. An outgoing-call handling apparatus, said apparatus comprising
a network element;
a mobile station;
wherein said network element is programmed to store telephone numbers and corresponding names, to recognize said names when spoken, to answer and connect incoming calls, to receive and evaluate commands from said incoming calls, and to send at least one command signal to the connected calls; and
wherein said mobile station is programmed to receive at least one command signal from said network element and to carry out calling functions corresponding to said command signals.

30. The method of claim 29 wherein said command signal comprises at least one of: first data corresponding to a telephone number, a control signal, and a second data corresponding to a network element callback number.

31. The apparatus of claim 29 wherein said network element is a platform.

32. The apparatus of claim 31 wherein said network element is coupled to a public telephone network.

33. The apparatus of claim 32 wherein said public telephone network is a public switched telephone network.

34. The apparatus of claim 32 wherein said public telephone network is a integrated services digital network.

35. The apparatus of claim 33 wherein said mobile station comprises a subscriber identity module.

36. The apparatus of claim 29 wherein said network comprises an intelligent network platform.

37. An outgoing-call handling method, said method carried out by a communications device and a platform, said method comprising the following steps:

a) the communications device receiving an attention signal from a user of the communications device;

b) the communications device calling the platform;

c) the platform answering the call;

d) the platform sending a greeting;

e) the communications device receiving a greeting from the platform;

f) the communications device receiving a user command from the user;

g) the communications device communicating said user command to the platform;

h) the platform sending a command signal corresponding to said user command to the communications device;

i) the communications device receiving said command signal;

j) the communications device carrying out a function corresponding to said command signal.

38. The method of claim 37 wherein said communications device is a mobile station.

* * * * *